US009353265B2

(12) United States Patent
Ono et al.

(10) Patent No.: US 9,353,265 B2
(45) Date of Patent: May 31, 2016

(54) IMAGE DISPLAY SEALANT DAM COMPOSITION AND IMAGE DISPLAY HAVING THE SAME

(71) Applicant: MOMENTIVE PERFORMANCE MATERIALS JAPAN LLC, Tokyo (JP)

(72) Inventors: Kazuhisa Ono, Tokyo (JP); Koji Okawa, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 0 days.

(21) Appl. No.: 14/429,138

(22) PCT Filed: Mar. 28, 2014

(86) PCT No.: PCT/JP2014/059357
§ 371 (c)(1),
(2) Date: Mar. 18, 2015

(87) PCT Pub. No.: WO2014/181609
PCT Pub. Date: Nov. 13, 2014

(65) Prior Publication Data
US 2015/0232666 A1    Aug. 20, 2015

(30) Foreign Application Priority Data

May 8, 2013  (JP) .................................. 2013-098592
Mar. 11, 2014  (JP) .................................. 2014-047932

(51) Int. Cl.
*C08L 83/04*    (2006.01)

(52) U.S. Cl.
CPC ........... *C08L 83/04* (2013.01); *C08L 2205/025* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| 3,816,282 | A | * | 6/1974 | Viventi | .................. B01J 19/081 522/172 |
| 4,707,503 | A | * | 11/1987 | Itoh | ...................... C08K 5/5406 522/99 |
| 4,908,395 | A | * | 3/1990 | Kurita | .................... C08F 299/08 522/42 |
| 4,935,455 | A | * | 6/1990 | Huy | ...................... C03C 25/106 522/83 |
| 4,946,874 | A | * | 8/1990 | Lee | ....................... C03C 25/106 522/14 |
| 5,100,993 | A | * | 3/1992 | Hida | .................... C08K 5/5406 522/172 |
| 5,158,988 | A | * | 10/1992 | Kurita | .................... C08K 5/53 522/64 |
| 5,328,941 | A | * | 7/1994 | Hayashi | ................ C08F 299/08 522/33 |
| 5,420,222 | A | * | 5/1995 | Stepp | ..................... C08L 83/04 522/35 |
| 5,684,113 | A | * | 11/1997 | Nakanishi | .............. C09J 183/04 427/503 |
| 5,952,397 | A | * | 9/1999 | Fujiki | ................. B29C 33/3878 264/496 |
| 2013/0065983 | A1 | | 3/2013 | Ono et al. | |

FOREIGN PATENT DOCUMENTS

| EP | 590542 | A2 | 4/1994 |
| JP | 02245060 | A | 9/1990 |
| JP | 03064389 | A | 3/1991 |
| JP | 03074463 | A | 3/1991 |
| JP | 04198270 | A | 7/1992 |
| JP | 06107951 | A | 4/1994 |
| JP | 06345970 | A | 12/1994 |
| JP | 2002121259 | A | 4/2002 |
| JP | 2002371261 | A | 12/2002 |
| JP | 2005171189 | A | 6/2005 |

(Continued)

OTHER PUBLICATIONS

International Search Report (ISR) dated Jun. 24, 2014 issued in International Application No. PCT/JP2014/059357.
Japanese Office Action (Notification of Reasons for Rejection) dated Apr. 8, 2014 issued in counterpart Japanese Application No. 2014-047932.

(Continued)

*Primary Examiner* — Robert S Loewe
(74) *Attorney, Agent, or Firm* — Holtz, Holtz & Volek PC

(57) ABSTRACT

The invention provides dam compositions which can give cured products serving as dam materials exhibiting appropriate hardness and adhesion with respect to adherends and which are preferably such that the dam materials also have inconspicuous joints with fillers. The invention also provides image displays manufactured with the compositions.

An image display sealant dam composition includes (A) a polyorganosiloxane having a mercaptoalkyl group bonded to a silicon atom, and having a viscosity at 23° C. of 20 to 25000 cP; (B) an aliphatic unsaturated group-containing polyorganosiloxane including an aliphatic unsaturated group-containing linear polyorganosiloxane (B1) represented by Formula (I) and optionally further including a branched polyorganosiloxane (B2) having $SiO_{4/2}$ units, $R'_3SiO_{1/2}$ units and $R'_2SiO_{2/2}$ units, and optionally further having $R'SiO_{3/2}$ units, at least three R' groups per molecule of the branched polyorganosiloxane (B2) are aliphatic unsaturated groups; (C) a photoreaction initiator; (D) an aliphatic unsaturated group-containing silane compound; and (E) a fumed silica having a BET specific surface area of 180 to 500 $m^2/g$. In the composition, the ratio of the number of the mercaptoalkyl groups present in (A) to the total number of the aliphatic unsaturated groups in (B) and (D) is 0.45 to 1.50; the amount of (E) is 0.5 to 24 parts by weight per 100 parts by weight of (B); and the composition has a viscosity at 23° C. of 20,000 to 10,000,000 cP. An image display includes an image display component and a protective component sealed with the composition.

14 Claims, No Drawings

(56) References Cited

FOREIGN PATENT DOCUMENTS

| | | |
|---|---|---|
| JP | 2008280368 A | 11/2008 |
| JP | 5010761 B2 | 8/2012 |
| WO | 2012086402 A1 | 6/2012 |

OTHER PUBLICATIONS

Related U.S. Appl. No. 14/429,169, filed Mar. 18, 2015, First Named Inventor: Kazuhisa Ono, Title: "Image Display Sealant Dam Composition and Image Display Having the Same".

* cited by examiner

IMAGE DISPLAY SEALANT DAM COMPOSITION AND IMAGE DISPLAY HAVING THE SAME

CROSS-REFERENCE TO RELATED APPLICATION

This application is a United States National Phase application of International Application No. PCT/JP2014/059357 filed Mar. 28, 2014.

TECHNICAL FIELD

The present invention relates to an image display sealant dam composition and an image displays using the composition.

BACKGROUND ART

In recent years, attentions have been drawn to flat panel image displays such as liquid crystal displays, plasma displays and organic EL displays. Flat panel image displays usually have a display region (an image display component) in which a plurality of pixels that are composed of semiconductor layers, phosphor layers or emission layers constituting active elements are arranged in a matrix form between a pair of substrates including at least one optically transparent substrate such as glass. In general, this display region (image display component) and a protective component formed of glass or an optical plastic such as acrylic resin are attached to each other while the periphery is tightly sealed with an adhesive.

In such image displays, a sealant is disposed between the protective component and the image display component to prevent a decrease in visibility (viewability) due to factors such as reflection of outside light or indoor illumination light. For example, the sealants are UV curable silicone resin compositions (Patent Literature 1) or heat curable silicone resin compositions (Patent Literature 2). In addition to silicone resin compositions, epoxy resin compositions may be used as sealants at times (Patent Literature 3).

CITATION LIST

Patent Literature

Patent Literature 1: WO 2012/086402
Patent Literature 2: Japanese Patent Application Kokai Publication No. H6-345970
Patent Literature 3: Japanese Patent Application Kokai Publication No. 2002-121259

DISCLOSURE OF INVENTION

Technical Problem

When the UV curable resin composition is applied as a sealant to an image display component (for example, a liquid crystal display panel), the composition exhibits fluidity and may be squeezed out of the display component and further to the backside of the display component. This problem is more marked in recent years with the increase in size of the display components. A known approach to solving this problem is to form a frame of a dam composition beforehand on the display component or the protective component and to apply the composition inside the frame, thereby preventing defects such as squeezing out.

Patent Literature 3 also discloses that fine silica is added to the epoxy resin composition sealant to form a dam material. However, Patent Literature 3 does not describe any hardness or adhesion of cured products of the dam material. Further, Patent Literature 3 does not describe the use of other types of resin sealants as dam materials. Although Examples disclosed in Patent Literature 2 use a dam material, the chemical composition of the material is not described in detail. Further, Patent Literature 2 describes that this dam material was thermally cured, but there is no description of the hardness or the adhesion of the cured product.

An object of the present invention is to provide silicone-based dam compositions that can give cured products serving as dam materials exhibiting appropriate hardness and adhesion with respect to adherends, and to provide image displays manufactured with the compositions. Preferably, a further object of the invention is to eliminate the possibility that the viewability of image displays may be decreased by the presence of conspicuous joints between a dam frame and a sealant applied inside the frame. That is, a further object of the invention is to provide dam compositions which have the above properties and also can form inconspicuous joints with sealants, and to provide image displays manufactured with the compositions.

Solution to Problem

Invention 1 resides in an image display sealant dam composition including:

(A) a polyorganosiloxane having a mercaptoalkyl group bonded to a silicon atom, the polyorganosiloxane (A) having a viscosity at 23° C. of 20 to 25000 cP;

(B) an aliphatic unsaturated group-containing polyorganosiloxane including an aliphatic unsaturated group-containing linear polyorganosiloxane (B1) represented by Formula (I):

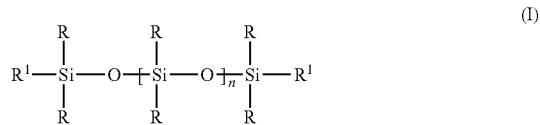

(in the formula:
each $R^1$ group independently represents an aliphatic unsaturated group,
each R group independently represents a C1 to C6 alkyl group or a C6 to C12 aryl group, and 1 to 60 mol % of the total R groups are C6 to C12 aryl groups, and
the letter n is a value such that the viscosity at 23° C. becomes 100 to 1,000,000 cP), optionally a branched polyorganosiloxane (B2) having $SiO_{4/2}$ units, $R'_3SiO_{1/2}$ units and $R'_2SiO_{2/2}$ units, and optionally further having $R'SiO_{3/2}$ units (in the formulae, each R' group is independently a C1 to C6 alkyl group or an aliphatic unsaturated group), at least three R' groups per molecule of the branched polyorganosiloxane (B2) are aliphatic unsaturated groups;

(C) a photoreaction initiator;

(D) an aliphatic unsaturated group-containing silane compound; and (E) a fumed silica having a BET specific surface area of 180 to 500 $m^2/g$;

wherein the ratio of the number of the mercaptoalkyl groups present in (A) to the total number of the aliphatic unsaturated groups in (B) and (D) is 0.45 to 1.50;

the amount of (E) is 0.5 to 24 parts by weight per 100 parts by weight of (B);

the composition has a viscosity at 23° C. of 20,000 to 10,000,000 cP.

Invention 2 resides in an image display sealant dam composition according to Invention 1, wherein the ratio of the number of the mercaptoalkyl groups in (A) to the number of the aliphatic unsaturated groups in (B) is 0.5 to 4.0.

Invention 3 resides in an image display sealant dam composition according to Invention 1 or 2, wherein the ratio of the number of the mercaptoalkyl groups in (A) to the number of the aliphatic unsaturated groups in (D) is 1.2 to 3.5.

Invention 4 resides in an image display sealant dam composition according to any of Inventions 1 to 3, wherein the fumed silica (E) has a BET specific surface area of 300 to 500 m²/g.

Invention 5 resides in an image display sealant dam composition according to any of Inventions 1 to 4, wherein the thixotropic ratio $V_{6rpm}/V_{12rpm}$ is 1.05 to 2.0 wherein $V_{6rpm}$ and $V_{12rpm}$ are values of the viscosity (cP) of the dam composition measured with a B-type rotational viscometer at 23° C. and a rotational speed of 6 rpm, and at 23° C. and a rotational speed of 12 rpm, respectively.

Invention 6 resides in an image display sealant dam composition according to any of Inventions 1 to 5, wherein the content of (C) is 0.05 to 50 parts by weight per 100 parts by weight of (B).

Invention 7 resides in an image display sealant dam composition according to any of Inventions 1 to 6, wherein the aliphatic unsaturated group-containing silane compound (D) is one or more selected from the group consisting of 3-methacryloxypropyltriethoxysilane, 3-methacryloxypropyltrimethoxysilane, vinyltrimethoxysilane and vinyltriethoxysilane.

Invention 8 resides in an image display that comprises an image display component and a protective component sealed with the image display sealant dam composition described in any of Inventions 1 to 7.

Advantageous Effects of Invention

The inventive dam compositions may form dam frames in image displays which exhibit appropriate hardness and adhesion with respect to adherends. According to a preferred embodiment, the dam frame further has an inconspicuous joint with a sealant applied inside the frame, and consequently image displays having good viewability may be obtained.

BEST MODE FOR CARRYING OUT INVENTION

An image display sealant dam composition according to the present invention includes:

(A) a polyorganosiloxane having a mercaptoalkyl group bonded to a silicon atom, the polyorganosiloxane (A) having a viscosity at 23° C. of 20 to 25000 cP;

(B) an aliphatic unsaturated group-containing polyorganosiloxane including an aliphatic unsaturated group-containing linear polyorganosiloxane (B1) represented by Formula (I):

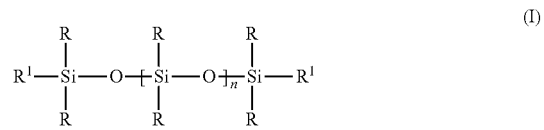

(in the formula:

each $R^1$ group independently represents an aliphatic unsaturated group, each R group independently represents a C1 to C6 alkyl group or a C6 to C12 aryl group, and 1 to 60 mol % of the total R groups are C6 to C12 aryl groups, and the letter n is a value such that the viscosity at 23° C. becomes 100 to 1,000,000 cP), and optionally further including a branched polyorganosiloxane (B2) having $SiO_{4/2}$ units, $R'_3SiO_{1/2}$ units and $R'_2SiO_{2/2}$ units, and optionally further having $R'SiO_{3/2}$ units (in the formulae, each R' group is independently a C1 to C6 alkyl group or an aliphatic unsaturated group), at least three R' groups per molecule of the branched polyorganosiloxane (B2) are aliphatic unsaturated groups;

(C) a photoreaction initiator;

(D) an aliphatic unsaturated group-containing silane compound; and (E) a fumed silica having a BET specific surface area of 180 to 500 m²/g.

The composition of the invention includes a polyorganosiloxane (A) having a mercaptoalkyl group bonded to a silicon atom. This polyorganosiloxane has a viscosity at 23° C. of 20 to 25000 cP.

The average number of the mercaptoalkyl groups bonded to silicon atoms in one molecule of (A) may be 2 to 20 to suppress excessive cure shrinkage rate while ensuring a stable structure by a crosslinking reaction. In particular, the average number is preferably from more than 2 to not more than 10, and more preferably from 3 to 7.

In the polyorganosiloxane (A), the alkyl moieties of the mercaptoalkyl groups bonded to a silicon atom may be C1 to C6 alkyl groups. Examples of the mercaptoalkyl groups include mercaptomethyl, 2-mercaptoethyl, 3-mercaptopropyl, 4-mercaptobutyl and 6-mercaptohexyl. For reasons such as easy synthesis, mercaptomethyl and 3-mercaptopropyl are preferable, and 3-mercaptopropyl is more preferable.

In the polyorganosiloxane (A), the organic groups other than the mercaptoalkyl groups bonded to a silicon atom may be substituted or unsubstituted monovalent hydrocarbon groups (except aliphatic unsaturated groups). Specific examples include alkyl groups such as C1 to C6 alkyl groups (for example, methyl, ethyl and propyl); cycloalkyl groups such as C3 to C10 cycloalkyl groups (for example, cyclohexyl); aryl groups such as C6 to C12 aryl groups (for example, phenyl, tolyl and xylyl); aralkyl groups such as C7 to C13 aralkyl groups (for example, 2-phenylethyl and 2-phenylpropyl); and substituted hydrocarbon groups such as halogen-substituted hydrocarbon groups (for example, chloromethyl, chlorophenyl and 3,3,3-trifluoropropyl). For reasons such as easy synthesis, alkyl groups are preferable. In particular, methyl, ethyl and propyl are preferable, and methyl is more preferable. To adjust refractive index, aryl groups may be used in combination therewith. For reasons such as easy synthesis, in particular, phenyl is preferable.

The main chain structures of (A) may be any of linear structures, branched structures and ring structures, with branched structures being preferable. Examples include branched polyorganosiloxanes containing mercaptoalkyl groups which have R″SiO$_{3/2}$ units, R″$_3$SiO$_{1/2}$ units and R″$_2$SiO$_{2/2}$ units, and optionally further have SiO$_{4/2}$ units (in the formulae, each of R″ is independently an unsubstituted or substituted monovalent hydrocarbon group (except an aliphatic unsaturated group)), and which are such that 2 to 20 R″ groups per molecule are mercaptoalkyl groups. Examples of the mercaptoalkyl groups and the unsubstituted or substituted monovalent hydrocarbon groups include those mentioned hereinabove. The mercaptoalkyl groups R″ may be present in any of the above R″-containing units, but are preferably present in the form of R″SiO$_{3/2}$ units. The mercaptoalkyl groups and the unsubstituted or substituted monovalent hydrocarbon groups may be any of the aforementioned groups. From the viewpoints of workability and crosslinking reactivity, the ratio of the number of the siloxane units having mercaptoalkyl groups to the number of the siloxane units having no mercaptoalkyl groups is preferably 1:60 to 1:5, although not limited thereto.

The viscosity of (A) at 23° C. is 20 to 25000 cP. From the viewpoints of workability and refractive index, for example, the viscosity may be 30 to 23000 cP. From the viewpoints of compatibility and workability, for example, the viscosity at 23° C. may be 20 to 2000 cP, and more preferably 50 to 500 cP.

In the specification, the viscosity is a value measured at 23° C. on a B-type rotational viscometer (Vismetron VDA-L) (manufactured by Shibaura System) with rotors Nos. 2 to 4 at 30 to 60 rpm. (When otherwise specified, the rotational speeds are not limited to the above.)

The number of the mercapto groups in (A) may be measured by colorimetric titration with iodine. This method utilizes the reaction represented by:

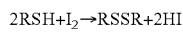

2RSH+I$_2$→RSSR+2HI

During the titration, the titration liquid turns light yellow when a slight excess of iodine is added.

The polyorganosiloxane (A) preferably has high transparency. The level of transparency may be such that the transmittance to visible light wavelengths (360 to 780 nm) is 80% or more when the polyorganosiloxane (A) packed in a container with a thickness of 10 mm is analyzed at 23° C. on a spectrophotometer to measure the transmittance. To ensure that cured products of the present compositions will stably exhibit transparency, the transmittance is preferably 90% or more.

The polyorganosiloxanes (A) may be prepared by any methods without limitation. For example, they may be produced by the hydrolysis, polycondensation and re-equilibration of alkylchlorosilanes or mercaptoalkylalkoxysilanes such as mercaptopropyltrimethoxysilane, mercaptopropyltriethoxysilane, mercaptopropylmethyldimethoxysilane, mercaptopropylmethyldiethoxysilane, mercaptopropyldimethylmethoxysilane and mercaptopropyldimethylethoxysilane, with desired alkylchlorosilanes, alkylalkoxysilanes or silanol-containing siloxanes.

The components (A) may be used singly, or two or more may be used in combination.

The composition of the invention includes an aliphatic unsaturated group-containing polyorganosiloxane (B). The polyorganosiloxane (B) includes an aliphatic unsaturated group-containing linear polyorganosiloxane (B1) represented by Formula (I):

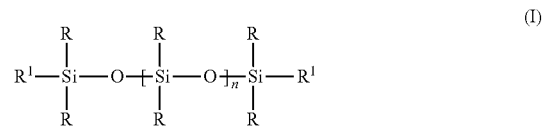

(in the formula:
each R1 group independently represents an aliphatic unsaturated group,
each R group independently represents a C1 to C6 alkyl group or a C6 to C12 aryl group, and 1 to 60 mol % of the total R groups are C6 to C12 aryl groups, and
the letter n is a value such that the viscosity at 23° C. becomes 100 to 1,000,000 cP), and optionally further includes a branched polyorganosiloxane (B2) having SiO$_{4/2}$ units, R′$_3$SiO$_{1/2}$ units and R′$_2$SiO$_{2/2}$ units, and optionally further having R′SiO$_{3/2}$ units (in the formulae, each R′ group is independently a C1 to C6 alkyl group or an aliphatic unsaturated group), at least three R′ groups per molecule of the branched polyorganosiloxane (B2) are aliphatic unsaturated groups.

In the polyorganosiloxane (B), the component (B2) is an optional component which may be added for purposes such as adjusting the hardness of cured products. The use of (B2) may enhance adhesion with respect to adherends, in particular, polarizing plates. For example, the component (B2) may be used in such an amount that the number of the aliphatic unsaturated groups in (B2) represents 20 to 85% of the total number of the aliphatic unsaturated groups in (B). From the viewpoint of quick curability, the proportion of the number of the aliphatic unsaturated groups in (B2) is preferably more than 50%, for example, 60 to 85%, and more preferably 65 to 85%.

In Formula (I) regarding (B1), R$^1$ groups are aliphatic unsaturated groups. R$^1$ groups at both terminals may be the same or different from each other, and are preferably the same as each other.

Examples of the aliphatic unsaturated groups include alkenyl groups such as C2 to C6 alkenyl groups (for example, vinyl, propenyl, butenyl and hexenyl). Alkenyl groups having unsaturated terminals are more preferable. For reasons such as easy synthesis, vinyl groups are preferable.

In Formula (I), R groups are C1 to C6 alkyl groups (for example, methyl, ethyl and propyl) or C6 to C12 aryl groups (for example, phenyl, tolyl and xylyl). R groups may be the same or different from one another.

It is preferable that 1 to 60 mol % of R groups are C6 to C12 aryl groups from the viewpoint of adjusting refractive index; it is preferable that 1 to 50 mol % of R groups are C6 to C12 aryl groups from the viewpoints of viscosity and thixotropy; and it is more preferable that the proportion is 1 to 35 mol %.

For reasons such as easy synthesis, the C1 to C6 alkyl groups are preferably methyl groups, and the C6 to C12 aryl groups are preferably phenyl groups.

The polyorganosiloxane (B1) represented by Formula (I) is preferably such that 1 to 60 mol % of R groups are phenyl groups and the balance is methyl groups, more preferably such that 1 to 50 mol % of R groups are phenyl groups and the balance is methyl groups, and still more preferably such that 1 to 35 mol % of R groups are phenyl groups and the balance is methyl groups.

From the viewpoint of the workability of the composition, the viscosity of (B1) at 23° C. is 100 to 1,000,000 cP, more preferably 1000 to 1,000,000 cP, and still more preferably 3000 to 500,000 cP. Any viscosity higher than necessary is not preferable because a highly viscous composition produces sticky strings attached to the orifice and tends to cause problems such as contamination when the orifice is moved after the application of the composition. The productivity of manufactures using the present composition is largely affected by dischargeability and shape retention after discharging. In view of these properties, the viscosity is particularly preferably in the range of 15,000 to 300,000 cP.

The number of the aliphatic unsaturated groups in (B1) may be obtained from the molecular weight calculated based on an average structural formula according to NMR.

The polyorganosiloxanes (B1) may be prepared by any methods without limitation. For example, they may be obtained by the polycondensation and re-equilibration of chlorosilanes necessary for the desired structures such as dimethyldichlorosilane, diphenyldichlorosilane, methylphenyldichlorosilane and dimethylvinylchlorosilane, or by the cohydrolysis, polycondensation and re-equilibration of alkoxysilanes necessary for the desired structures such as dimethyldimethoxysilane, diphenyldimethoxysilane, methylphenyldimethoxysilane and dimethylvinylmethoxy. Alternatively, the compounds may be obtained by the ring-opening polymerization and re-equilibration of siloxanes necessary for the desired structures such as 1,1,3,3,5,5,7,7-octamethylcyclotetrasiloxane, 1,1,3,3,5,5,7,7-octaphenylcyclotetrasiloxane and 1,1,3,3-tetramethyl-1,3-divinyldisiloxane, in the presence of alkali catalysts (such as alkali metal hydroxide salts, alkali metal silanolates and ammonium hydroxide salts) or acid catalysts (such as sulfuric acid, sulfuric acid silanolate and trifluoromethanesulfonic acid).

The components (B1) may be used singly, or two or more may be used in combination.

The component (B2) is a branched polyorganosiloxane which has $SiO_{4/2}$ units, $R'_3SiO_{1/2}$ units and $R'_2SiO_{2/2}$ units, and optionally further has $R'SiO_{3/2}$ units (in the formulae, each R' group is independently a C1 to C6 alkyl group or an aliphatic unsaturated group), and which is such that at least three R' groups per molecule are aliphatic unsaturated groups.

Examples of the components (B2) include branched polyorganosiloxanes having 6 to 10 mol of the $SiO_{4/2}$ units and 4 to 8 mol of the $R'SiO_{1/2}$ units per 1 mol of the $R'_2SiO_{2/2}$ units. Preferably, the polyorganosiloxanes (B2) are solids or are viscous semisolid resins or liquids at normal temperature. For example, the weight average molecular weight may be 1,000 to 400,000, and preferably 2,000 to 200,000. The weight average molecular weight is a value measured by gel permeation chromatography (GPC) using a polystyrene calibration curve.

Examples of the aliphatic unsaturated groups represented by R' groups include the aliphatic unsaturated groups mentioned with respect to (B1), specifically, alkenyl groups such as C2 to C6 alkenyl groups (for example, vinyl, propenyl, butenyl and hexenyl). Alkenyl groups having unsaturated terminals are more preferable. For reasons such as easy synthesis, vinyl groups are preferable. The aliphatic unsaturated groups R' may be present in any of the above R'-containing units, but are preferably present in the form of $R'_2SiO$ units.

R' groups other than the aliphatic unsaturated groups are C1 to C6 alkyl groups (for example, methyl, ethyl and propyl). In view of heat resistance, methyl groups are preferable.

The polyorganosiloxanes (B2), when used, may be used singly, or two or more may be used in combination.

The composition of the invention includes a photoreaction initiator (C). The initiator (C) is a component that functions as a radical initiator or a sensitizer in the photocrosslinking between (A) and (B). From the viewpoint of reactivity, examples of the components (C) include aromatic hydrocarbons, acetophenone and derivatives thereof, benzophenone and derivatives thereof, o-benzoylbenzoate esters, benzoin and benzoin ether and derivatives thereof, xanthone and derivatives thereof, disulfide compounds, quinone compounds, halogenated hydrocarbons and amines, and organic peroxides. From the viewpoints of the compatibility with silicones as well as stability, more preferred initiators are compounds having a substituted or unsubstituted benzoyl group, and organic peroxides.

Examples of the initiators (C) include acetophenone, propiophenone, 2-hydroxy-2-methylpropiophenone, 2,2-dimethoxy-1,2-diphenylethan-1-one (IRGACURE 651: manufactured by BASF AG), 2-hydroxy-2-methyl-1-phenyl-propan-1-one (DAROCUR 1173: manufactured by BASF AG), 1-hydroxy-cyclohexyl-phenyl-ketone (IRGACURE 184: manufactured by BASF AG), 1-[4-(2-hydroxyethoxy)-phenyl]-2-hydroxy-2-methyl-1-propan-1-one (IRGACURE 2959: manufactured by BASF AG), 2-hydroxy-1-{4-[4-(2-hydroxy-2-methyl-propionyl)-benzyl]phenyl}-2-methyl-propan-1-one (IRGACURE 127: manufactured by BASF AG), 2-methyl-1-(4-methylthiophenyl)-2-morpholinopropan-1-one (IRGACURE 907: manufactured by BASF AG), 2-benzyl-2-dimethylamino-1-(4-morpholinophenyl)-butanone-1 (IRGACURE 369: manufactured by BASF AG), 2-(dimethylamino)-2-[(4-methylphenyl)methyl]-1-[4-(4-morpholinyl)phenyl]-1-butanone (IRGACURE 379: manufactured by BASF AG); 2,4,6-trimethylbenzoyl-diphenyl-phosphine oxide (LUCIRIN TPO: manufactured by BASF AG), bis(2,4,6-trimethylbenzoyl)-phenylphosphine oxide (IRGACURE 819: manufactured by BASF AG); 1,2-octanedione 1-[4-(phenylthio)-2-(O-benzoyloxime)] (IRGACURE OXE 01: manufactured by BASF AG), ethanone 1-[9-ethyl-6-(2-methylbenzoyl)-9H-carbazol-3-yl]-1-(O-acetyloxime) (IRGACURE OXE 02: manufactured by BASF AG); a mixture of oxyphenylacetic acid 2-[2-oxo-2-phenylacetoxyethoxy]ethyl ester and oxyphenylacetic acid 2-(2-hydroxyethoxy)ethyl ester (IRGACURE 754: manufactured by BASF AG), phenylglyoxylic acid methyl ester (DAROCUR MBF: manufactured by BASF AG), ethyl-4-dimethylaminobenzoate (DAROCUR EDB: manufactured by BASF AG), 2-ethylhexyl-4-dimethylaminobenzoate (DAROCUR EHA: manufactured by BASF AG), bis(2,6-dimethoxybenzoyl)-2,4,4-trimethyl-pentylphosphine oxide (CGI 403: manufactured by BASF AG), benzoyl peroxide, and cumene peroxide.

The initiators (C) may be used singly, or two or more may be used in combination.

The composition of the invention includes an aliphatic unsaturated group-containing silane compound (D). The compound (D) serves to improve the adhesion and bonding properties of cured products with respect to substrates. Examples of the aliphatic unsaturated groups include the aliphatic unsaturated groups mentioned with respect to (B1), specifically, alkenyl groups such as C2 to C6 alkenyl groups (for example, vinyl, propenyl, butenyl and hexenyl). Alkenyl groups having unsaturated terminals are more preferable. For reasons such as easy synthesis, vinyl groups are preferable.

Examples of the compounds (D) include 3-methacryloxypropyltriethoxysilane, 3-methacryloxypropyltrimethoxysilane, vinyltrimethoxysilane and vinyltriethoxysilane, with 3-methacryloxypropyltriethoxysilane and 3-methacryloxypropyltrimethoxysilane being preferable.

The compounds (D) may be used singly, or two or more may be used in combination.

The composition of the invention includes a fumed silica (E) having a BET specific surface area of 180 to 500 $m^2/g$. The addition of the component (E) provides a viscosity suited for the formation of dams, and also imparts thixotropy. The inventive composition has a high viscosity of 20,000 cP or more. Thus, there is a general concern that wetting properties are low and cured products exhibit poor adhesion. However, by virtue of appropriate addition of the component (E), the composition of the invention can give cured products exhibiting good adhesion. This effect has been found to be contributed to by the addition of the component (E).

The BET specific surface area of the fumed silica is 180 to 500 m²/g. Within this range, the fumed silica may impart the thixotropy required for the composition while the amount added is small. This makes it easier for the composition to attain high transparency. From the viewpoint of transparency, the specific surface area is preferably 200 to 500 m²/g, and more preferably 300 to 500 m²/g. If a fumed silica having a BET specific surface area exceeding 500 m²/g is added, loads are incurred during preparation such as kneading, and such silica particles are easily clumped to cause surface defects such as granular structures. For this reason, fumed silicas having a specific surface area of not more than 500 m²/g are preferable.

The fumed silicas may be fumed silicas without surface treatment, or may be surface-treated fumed silicas. Surface treatments may enhance compatibility and thixotropy. Examples of the surface treatments include treatments with chlorosilanes (such as methyltrichlorosilane, dimethyldichlorosilane and trimethylchlorosilane), alkoxysilanes, hexamethyldisilazanes, octamethylcyclotetrasiloxanes and dimethylsiloxane oligomers. In particular, treatments with hexamethyldisilazanes are preferable in terms of transparency. These surface treatment agents may be added together with the fumed silica during the preparation of the present composition, and the silica may be surface treated while the components are being kneaded.

The components (E) may be used singly, or two or more may be used in combination.

In order for cured products to have appropriate hardness and elasticity, the ratio of HS to ViB+ViD, (HS/(ViB+ViD)), is 0.45 to 1.50, preferably 0.50 to 1.30, and still more preferably 0.60 to 1.20 wherein HS is the number of the mercaptoalkyl groups bonded to silicon atoms in (A), ViB is the number of the aliphatic unsaturated groups in (B), and ViD is the number of the aliphatic unsaturated groups in (D). When the polyorganosiloxane (B) includes the component (B1) alone, the number of the aliphatic unsaturated groups in (B) is equal to the number of the aliphatic unsaturated groups in (B1), namely, ViB1. When, on the other hand, the polyorganosiloxanes (B1) and (B2) are used in combination, the number of the aliphatic unsaturated groups in (B) is the total of the number of the aliphatic unsaturated groups in (B1), namely, ViB1, and the number of the aliphatic unsaturated groups in (B2), namely, ViB2.

To ensure good adhesion and to suppress temperature changes of cured products, the ratio of HS to ViB, (HS/ViB), is preferably 0.5 to 3.5, more preferably 0.95 to 3, and still more preferably 1 to 2.

To further enhance adhesion and to further suppress temperature changes of cured products, the ratio of HS to ViD, (HS/ViD), is preferably 1.2 to 3.5, more preferably 1.5 to 3, and still more preferably 1.8 to 2.5.

From the viewpoints of photoreaction initiation action, heat resistance during curing, and viewability (high transmittance and low fogging properties), the amount of (C) is preferably 0.05 to 50 parts by weight, and more preferably 0.1 to 40 parts by weight per 100 parts by weight of (B).

The component (E) may be used in an amount of 0.5 to 24 parts by weight per 100 parts by weight of (B). To improve the adhesion with respect to substrates, the amount of (E) is preferably 1 to 23 parts by weight, and more preferably 5 to 20 parts by weight.

From the viewpoints of deformation resistance and viewability, the total amount of (A) to (E) is preferably not less than 55% by weight, more preferably not less than 75% by weight, and still more preferably not less than 90% by weight of the composition.

Preferably, the composition of the invention further includes a silicone resin-based adhesion improver (F) (except the components (A), (B) and (D)). The silicone resin-based adhesion improver is a silicone resin having tackiness, and is added as required to further increase and stabilize the adhesion of the UV curable silicone resin composition of the invention. The use of this component is expected to provide high effects particularly when the adherends are polarizing plates.

From the viewpoints of tackiness and economic efficiency, the component (F) is preferably one or more silicone resin-based adhesion improvers (which do not contain an aliphatic unsaturated group or a mercapto group) selected from the group consisting of MQ resins, MDQ resins, MT resins, MDT resins, MDTQ resins, DQ resins, DTQ resins and TQ resins. In view of fluidity and easy synthesis, one or more silicone resin-based adhesion improvers selected from the group consisting of MQ resins, MDQ resins, MDT resins and MDTQ resins are more preferable, and one or more silicone resin-based adhesion improvers selected from the group consisting of MQ resins, MDQ resins and MDT resins are still more preferable. Because of high tackiness and easy structural control, MQ resins are further preferable.

Examples of the MQ resins include silicone resins having an average structural formula represented by the following formula:

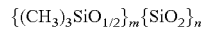

(wherein m+n=1, and m and n are numbers except 0). Examples of the MDQ resins include silicone resins having an average structural formula represented by the following formula:

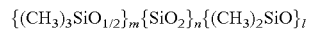

(wherein m+n+l=1, and m, n and l are numbers except 0). Examples of the MT resins include silicone resins having an average structural formula represented by the following formula:

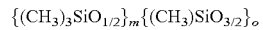

(wherein m+o=1, and m and o are numbers except 0). Examples of the MDT resins include silicone resins having an average structural formula represented by the following formula:

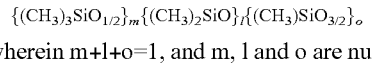

(wherein m+l+o=1, and m, l and o are numbers except 0). Examples of the MDTQ resins include silicone resins having an average structural formula represented by the following formula:

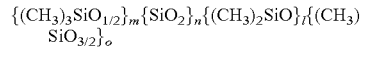

(wherein m+n+l+o=1, and m, n, l and o are numbers except 0). Examples of the DQ resins include silicone resins having an average structural formula represented by the following formula:

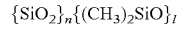

(wherein n+l=1, and n and l are numbers except 0). Examples of the DTQ resins include silicone resins having an average structural formula represented by the following formula:

$$\{SiO_2\}_n\{(CH_3)_2SiO\}_l\{(CH_3)SiO_{3/2}\}_o$$

(wherein n+l+o=1, and n, l and o are numbers except 0). Examples of the TQ resins include silicone resins having an average structural formula represented by the following formula:

$$\{SiO_2\}_n\{(CH_3)SiO_{3/2}\}_o$$

(wherein n+o=1, and m and o are numbers except 0).

The weight average molecular weight of (F) is preferably 2,000 to 100,000, more preferably 5,000 to 80,000, and still more preferably 10,000 to 60,000. Here, the weight average molecular weight is a value measured by gel permeation chromatography (GPC) using a polystyrene calibration curve.

The component (F) may be used in an amount of 150 parts by weight or less per 100 parts by weight of (B). To enhance adhesion with respect to substrates, the amount of (F) is preferably 5 to 150 parts by weight, more preferably 10 to 120 parts by weight, and still more preferably 15 to 100 parts by weight.

The composition of the invention may contain additives such as silane coupling agents (except the components (D)), inorganic fillers except fumed silicas, polymerization inhibitors, antioxidants, UV absorbers as light resistance improvers, and light stabilizers while still achieving the advantageous effects of the invention. The composition of the invention may contain an aliphatic unsaturated group-containing polyorganosiloxane (for example, an aliphatic unsaturated group-containing, branched polyorganosiloxane) other than the components (B) without impairing the advantageous effects of the invention; however, the present composition is preferably free from such additional polyorganosiloxanes.

Examples of the silane coupling agents include 3-aminopropyltriethoxysilane, 3-aminopropyltrimethoxysilane, 3-mercaptopropyltriethoxysilane, 3-mercaptopropyltrimethoxysilane, 3-glycidoxypropyltrimethoxysilane, 3-glycidoxypropyltriethoxysilane, trimethoxysilylpropyldiallyl isocyanurate, bis(trimethoxysilylpropyl)allyl isocyanurate, tris(trimethoxysilylpropyl)isocyanurate, triethoxysilylpropyldiallyl isocyanurate, bis(triethoxysilylpropyl)allyl isocyanurate and tris(triethoxysilylpropyl)isocyanurate.

Examples of the polymerization inhibitors include hydroquinone, p-methoxyphenol, t-butylcatechol and phenothiazine.

The antioxidants may be used to prevent the oxidation of cured products of the composition and improve weather resistance. Examples include hindered amine or hindered phenol antioxidants. Examples of the hindered amine antioxidants include, but are not limited to, N,N',N'',N'''-tetrakis-(4,6-bis(butyl-(N-methyl-2,2,6,6-tetramethylpiperidin-4-yl)amino)-triazin-2-yl)-4,7-diazadecane-1,10-diamine, dibutylamine.1,3,5-triazine.N,N'-bis-(2,2,6,6-tetramethyl-4-piperidyl-1,6-hexamethylenediamine.N-(2,2,6,6-tetramethyl-4-piperidyl) butylamine polycondensate, poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], polymer of dimethyl succinate and 4-hydroxy-2,2,6,6-tetramethyl-1-piperidinethanol, [reaction product of bis(2,2,6,6-tetramethyl-1-(octyloxy)-4-piperidyl)decanedioate, 1,1-dimethylethylhydroperoxide and octane (70%)]-polypropylene (30%), bis(1,2,2,6,6-pentamethyl-4-piperidyl)[[3,5-bis(1,1-dimethylethyl)-4-hydroxyphenyl]methyl]butyl malonate, methyl 1,2,2,6,6-pentamethyl-4-piperidyl sebacate, bis(2,2,6,6-tetramethyl-4-piperidyl)sebacate, bis(1,2,2,6,6-pentamethyl-4-piperidyl) sebacate, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, 4-benzoyloxy-2,2,6,6-tetramethylpiperidine, and 8-acetyl-3-dodecyl-7,7,9,9-tetramethyl-1,3,8-triazaspiro[4.5]decane-2,4-dione.

Examples of the hindered phenol antioxidants include, but are not limited to, pentaerythritol-tetrakis[3-(3,5-di-tert-butyl-4-hydroxyphenyl)propionate], thiodiethylene-bis[3-(3,5-di-tert-butyl-4-hydroxyphenyl)propionate], octadecyl-3-(3,5-di-tert-butyl-4-hydroxyphenyl)propionate), N,N'-hexane-1,6-diylbis[3-(3,5-di-tert-butyl-4-hydroxyphenylpropioamide), 3,5-bis(1,1-dimethylethyl)-4-hydroxy C7-C9 side chain alkyl benzenepropanoate, 2,4-dimethyl-6-(1-methylpentadecyl)phenol, diethyl[[3,5-bis(1,1-dimethylethyl)-4-hydroxyphenyl]methyl]phosphonate, 3,3',3'',5,5',5''-hexane-tert-butyl-4-a,a',a''-(mesitylene-2,4,6-tolyl)tri-p-cresol, calcium diethylbis[[[3,5-bis-(1,1-dimethylethyl)-4-hydroxyphenyl]methyl]phosphonate], 4,6-bis(octylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-2,4,6-(1H,3H,5H)-trione, reaction product of N-phenylbenzeneamine and 2,4,4-trimethylpentene, and 2,6-di-tert-butyl-4-(4,6-bis(octylthio)-1,3,5-triazin-2-ylamino) phenol. The antioxidants may be used singly, or two or more may be used in combination.

The light stabilizers may be used to prevent the photooxidative degradation of cured products, and examples thereof include benzotriazole compounds, hindered amine compounds and benzoate compounds. The UV absorbers as light resistance improvers may be used to prevent light degradation and to improve weather resistance, and examples thereof include UV absorbers such as benzotriazole compounds, triazine compounds, benzophenone compounds and benzoate compounds. Examples of the UV absorbers include, but are not limited to, benzotriazole UV absorbers such as 2,4-di-tert-butyl-6-(5-chlorobenzotriazol-2-yl)phenol, 2-(2H-benzotriazol-2-yl)-4,6-di-tert-pentylphenol, 2-(2H-benzotriazol-2-yl)-4-(1,1,3,3-tetramethylbutyl)phenol, methyl3-(3-(2H-benzotriazol-2-yl)-5-tert-butyl-4-hydroxyphenyl)propionate/polyethylene glycol 300 reaction product, and 2-(2H-benzotriazol-2-yl)-6-(linear and side chain dodecyl)-4-methylphenol; triazine UV absorbers such as 2-(4,6-diphenyl-1,3,5-triazin-2-yl)-5-[(hexyl)oxy]-phenol; benzophenone UV absorbers such as octabenzone; and benzoate UV absorbers such as 2,4-di-tert-butylphenyl-3,5-di-tert-butyl-4-hydroxybenzoate. The UV absorbers may be used singly, or two or more may be used in combination. Of the light stabilizers, hindered amine compounds are preferable. In particular, tertiary amine-containing hindered amine light stabilizers are preferably used to improve the storage stability of the composition. Examples of the tertiary amine-containing hindered amine light stabilizers include such light stabilizers as Tinuvin 622LD, Tinuvin 144 and CHIMASSORB 119FL (all manufactured by BASF AG); MARK LA-57, LA-62, LA-67 and LA-63 (all manufactured by ADEKA CORPORATION); and SANOL LS-765, LS-292, LS-2626, LS-1114 and LS-744 (all manufactured by DAIICHI SANKYO CO., LTD.).

In order to ensure that the composition retains shape after being discharged in the dam formation and to prevent the leakage of sealants, the viscosity of the present composition at 23° C. is 20,000 to 10,000,000 cP. Here, the viscosity is a value measured at a rotational speed of 6 rpm. From the viewpoint of shape retention, the lower limit is preferably 23,000 cP, and more preferably 25,000 cP. From the viewpoint of dischargeability, the upper limit is preferably 3,000,000 cP, and more preferably 2,000,000 cP.

In the present composition, it is preferable that the thixotropic ratio $V_{6rpm}/V_{12rpm}$ be 1.05 to 2.0 wherein $V_{6rpm}$ and $V_{12rpm}$ are values of the viscosity (cP) measured at 23° C. and a rotational speed of 6 rpm, and at 23° C. and a rotational speed of 12 rpm, respectively. With the thixotropic ratio being in this range, the composition may be discharged easily and may retain the shape after being discharged. The thixotropic ratio is more preferably 1.1 to 1.65, and still more preferably 1.1 to 1.6.

The composition of the invention may be obtained by blending the components (A) to (E), and optionally the component (F) and the additives. The composition is preferably prepared in such a manner that the component (A) is added to a blend of the component (B) and the optional component (F), the mixture is then mixed homogeneously, and the components (C) and (D) and an optional polymerization inhibitor are blended to the mixture in the absence of UV rays. For example, the composition may be obtained in such a manner that the components (A), (B) and optionally (F) are added to a universal mixing stirrer and are mixed together at room temperature (10 to 30° C.) and low speed to give a uniform mixture, thereafter the components (C) and (D) and the additives such as a polymerization inhibitor are added in the absence of UV rays, and the mixture is homogeneously mixed at low speed under reduced pressure while performing ice water cooling (10° C. or below), followed by defoaming and optionally filtration.

The composition of the invention may be cured by the application of UV rays. Examples of lamps having a wavelength region which can induce the reaction of (C) include high-pressure mercury lamps (UV-7000) and metal halide lamps (MHL-250, MHL-450, MHL-150, MHL-70) manufactured by USHIO INC.; metal halide lamps (JM-MTL 2KW) manufactured by JM tech Co. Ltd., South Korea; UV illumination lamps (OSBL 360) manufactured by Mitsubishi Electric Corporation; UV illuminators (UD-20-2) manufactured by Japan Storage Battery Co., Ltd.; fluorescent lamps (FL-20BLB) manufactured by Toshiba Corporation; and H valves, H plus valves, D valves, Q valves and M valves manufactured by Fusion Co. The irradiation dose is preferably 100 to 10000 mJ/cm$^2$, more preferably 300 to 5000 mJ/cm$^2$, and still more preferably 500 to 3500 mJ/cm$^2$.

Cured products of the present composition have the following advantageous properties.

[Transmittance to Visible Light After Curing]

The composition of the invention is advantageous in terms of viewability because the transmittance to visible light after the composition is cured with a cured thickness of 150 µm may be as high as 95% or more. The visible light transmittance is more preferably 96% or more, and still more preferably 98% or more. From the viewpoint of transmittance to visible light, it is preferable that the amount of (C) be small. The transmittance to visible light after curing may be enhanced by heat treating the components (A) and (B) individually or in the form of a homogenous mixture at 80 to 180° C. Such heat treatment is also preferable from the viewpoint of aging stability.

[Cure Shrinkage Rate Rate]

The composition of the invention advantageously exhibits a cure shrinkage rate of 1.0% or less. Thus, the composition may be advantageously applied to, for example, image displays to make it possible to prevent distortion easily and to ensure viewability. The cure shrinkage rate is preferably 0.5% or less, more preferably 0.3% or less, and still more preferably 0.2% or less.

[E hardness After Curing]

The composition of the invention may give cured products having an E hardness of 5 to 33. When the composition is applied to image displays, the cured products may appropriately relax external stress easily and may ensure viewability by preventing the penetration of water even under hot and humid conditions. The E hardness is preferably 5 to 30 and more preferably 10 to 30.

[Elongation After Curing]

The composition of the invention may give cured products having an elongation of 50% or more. Thus, external stress may be excellently relaxed and good deformation resistance may be ensured. The elongation after curing is preferably 80% or more, more preferably 100% or more, and still more preferably 200% or more.

The composition of the invention is a dam composition for use in image displays. The dam composition is used to form a frame on a display component or a protective component of an image display. The frame prevents a sealant that is applied inside the frame from being squeezed out of the component such as the display component. For example, the composition may be applied onto a liquid crystal panel along the edge through a discharging nozzle of a dispenser (the nozzle may be selected appropriately in accordance with the discharging amount, for example, 23 G), and thereafter a filler material may be applied and a cover panel may be laminated onto the liquid crystal panel. In this manner, the filler may be prevented from being squeezed out to the backside of the liquid crystal panel, and the contamination of surrounding areas may be avoided. The inventive composition exhibits good adhesion, and may be suitably applied to any of display components and protective components.

The composition of the invention is suited for the manufacturing of large-screen image displays having an image display panel size of 5 to 100 inches, more preferably 7 to 80 inches, and still more preferably 10 to 60 inches. Further, the present composition is suited for the manufacturing of ultrathin image displays preferably having an image display thickness of 10 to 500 µm, more preferably 20 to 450 µm, and still more preferably 50 to 400 µm.

The use of the present composition is advantageous when the sealant disposed between a protective component and an image display component of an image display is a UV curable resin composition, and more advantageously a UV curable silicone resin composition. The UV curable silicone resin compositions used as the sealants may be compositions described in WO 2012/086402. Specifically, examples of such sealants include UV curable silicone resin compositions including:

(A') a polyorganosiloxane having a mercaptoalkyl group bonded to a silicon atom, the polyorganosiloxane (A') having a viscosity at 23° C. of 20 to 25000 cP;

(B') an aliphatic unsaturated group-containing polyorganosiloxane, the polyorganosiloxane (B') including an aliphatic unsaturated group-containing linear polyorganosiloxane (B1') represented by Formula (I'):

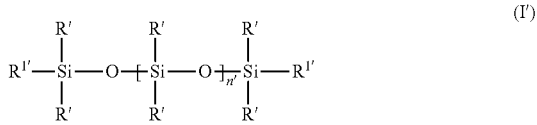

(in the formula:

each $R^{1'}$ group is independently an aliphatic unsaturated group, each R' group is independently a C1 to C6 alkyl group or a C6 to C12 aryl group, and 1 to 60 mol % of the total R' groups are C6 to C12 aryl groups, and the letter n' is a value such that the viscosity at 23° C. becomes 100 to 25000 cP, and preferably 100 to 8000 cP), and a branched polyorganosiloxane (B2') having $SiO_{4/2}$ units, $R''_3SiO_{1/2}$ units and $R''_2SiO_{2/2}$ units, and optionally further having $R''SiO_{3/2}$ units (in the formulae, each of R'' is independently a C1 to C6 alkyl group or an aliphatic unsaturated group), at least three R'' groups per molecule of the branched polyorganosiloxane (B2') are aliphatic unsaturated groups (the proportion of the number of the aliphatic unsaturated groups in (B2') is 50% or less of the total number of the aliphatic unsaturated groups in (B'));

(C') a photoreaction initiator; and (D') an aliphatic unsaturated group-containing silane compound.

Here, the ratio of the number of the mercaptoalkyl groups present in (A') to the total number of the aliphatic unsaturated groups in (B') and (D') is 0.5 to 1.05;

the ratio of the number of the mercaptoalkyl groups in (A') to the number of the aliphatic unsaturated groups in (B') is 0.95 to 3; and the ratio of the number of the mercaptoalkyl groups in (A') to the number of the aliphatic unsaturated groups in (D') is 1.5 to 3.

EXAMPLES

Hereinbelow, the present invention will be described in further detail by presenting Examples and Comparative Examples. Unless otherwise mentioned, part(s) and % indicate part(s) by weight and % by weight. The scope of the invention is not limited to such Examples. The curing of compositions prepared in Examples and Comparative Examples was performed with UVL-4001M manufactured by USHIO INC. at 120 W/cm². Unless otherwise mentioned, the maximum energy irradiation dose obtained in a curability test (measured with actinometer UIT-250 manufactured by USHIO INC.) was adopted as the UV ray energy irradiation dose. The maximum energy irradiation dose was the dose at which the change in E hardness of the cured product was 1 or below. In the process in which the composition was cured while increasing the irradiation dose in steps of 1000 mJ/cm², the E hardness of the cured product was determined to have reached as far as possible when the same value of E hardness was obtained successively two times or when the change in E hardness of the cured product was 1 or below; and the larger dose of the two successive irradiations was adopted.

[Property Evaluation Conditions]

(1) Measurement of Number of Mercapto Groups

A $\frac{1}{10}$ N iodine solution (a special grade reagent) was used as an iodine source, and the number of mercapto groups per unit weight was determined by colorimetric titration.

Calculation method: SH content (mmol/g)=(A×P×0.1)/(W×C)

A: The amount of the iodine solution dropped until color change.

P: The factor of the iodine solution (The factor described on the reagent): described when correction was necessary.

W: The weight (g) of the sample.

C: The nonvolatile content in the sample.

A preliminary measurement was performed to determine the amount of the iodine solution dropped. Thereafter, the measurement was carried out accurately three times, and the results of the three measurements were averaged.

(2) Measurement of Number of Aliphatic Unsaturated Groups

Assuming that the peaks assigned to $Si-CH_3$ (near 0.1 ppm), Si-Ph (near 7.3-7.7 ppm) and $CH_3Si-CH=CH_2$ (near 5.7-6.3 ppm) in NMR measurement corresponded to the $(CH_3)_2SiO$ units, $Ph_2-SiO$ units and $(CH_3)_2Si-CH=CH_2O_{1/2}$ units, respectively, the numbers of these units were obtained from the ratio of the respective peak intensities, thereby obtaining an average structural formula. From the formula, the molecular weight was obtained and the number of the unsaturated groups was calculated.

(3) Viscosity

With use of a rotational viscometer (Vismetron VDA-L) (manufactured by Shibaura System), the viscosity at 23° C. was measured with a prescribed rotational speed using the rotor No. 2 in the range of 400 cP or less, the rotor No. 3 in the range of above 400 to 1500 cP, and the rotor No. 4 in the range of above 1500 cP. Thixotropy was obtained from the ratio $V_{6rpm}/V_{12rpm}$ wherein $V_{6rpm}$ and $V_{12rpm}$ are values of the viscosity at a rotational speed of 6 rpm and a rotational speed of 12 rpm, respectively.

(4) Dischargeability

The composition was discharged through a double thread screwed plastic needle (manufactured by Musashi Engineering, Inc.: needle length: 12.7 mm, gauge: 20 G (inner diameter 0.58 mm, outer diameter 0.91 mm)). The weight (g) discharged in 10 seconds was obtained to evaluate dischargeability.

(5) Visible Light Transmittance

For liquid products, the samples were packed in a quartz cell to a thickness of 10 mm. For cured products, the samples were adjusted to a thickness of 150 μm. The transmittance to visible light wavelengths (360 to 780 nm) was measured at 23° C. with a spectrophotometer (CM-3500d manufactured by Minolta Co., Ltd.).

(6) Cure Shrinkage Rate

The specific gravity of the composition was measured before and after curing with an electronic gravimeter (SD-120L manufactured by MIRAGE). The cure shrinkage rate was calculated based on the difference in specific gravity from the following equation.

Cure shrinkage rate (%)=(Specific gravity after curing−Specific gravity before curing)/Specific gravity after curing)×100

(7) E Hardness After Curing

The composition was cured with various energy irradiation doses. In accordance with JIS K 6253 E, the E hardness of the cured products was measured at 23° C. with DUROMETER HARDNESS TYPE E (manufactured by ASKER). The E hardness of the cured product cured with the maximum energy irradiation dose was adopted as the E hardness after curing.

(8) Elongation After Curing

In accordance with JIS K 6301, the elongation of the cured product cured with the maximum energy irradiation dose was measured at 23° C. using a Schopper tensile tester (manufactured by Toyo Seiki Seisaku-Sho Ltd.).

(9) Specific Gravity

The specific gravity of cured products of the compositions was measured at 23° C. with an electronic gravimeter (SD-120L manufactured by MIRAGE).

(10) Crack Resistance and Discoloration (10-1) Heat Shock

The composition was applied onto the entire surface of a 1 mm thick glass plate, and a 1 mm thick PMMA plate was placed thereon, the thickness of the composition being 200 μm. The composition was then cured by the application of UV ray energy at a dose of 3000 mJ/cm$^2$, and an environmental test was carried out with temperature cycles of from −50° C. to 125° C. (held at each temperature for 30 minutes) (apparatus: TSA-71S-A manufactured by ESPEC CORP.).

Thereafter, the sample was brought back to 23° C., and the conditions of the cured product, the PMMA and the glass were observed with an optical microscope (×10 magnification).

The heat shock properties were evaluated as NG when the cured product had a crack extending 0.02 mm or more in one direction and/or an air layer extending 0.02 mm or more in one direction, and/or when any of the PMMA and the glass had a damage extending 0.02 mm or more in one direction.

The heat shock properties were evaluated as OK when the sample was free from these crack, air layer and damage.

(10-2) Testing Under Hot and Humid Conditions

The cured product was allowed to stand for 500 hours in a constant temperature and humidity chamber set at high temperature and high humidity conditions with a temperature of 85° C. and a humidity of 85% RH. Thereafter, the cured product was brought back to a temperature of 23° C. and a humidity of 50%, and discoloration was evaluated by measuring a yellow index, an indicator of the degree of discoloration, with a spectrophotometer (CM-3500d manufactured by Minolta Co., Ltd.).

Discoloration was evaluated as NG when the yellow index was 1.0% or more.

Discoloration was evaluated as OK when the yellow index was less than 1.0%.

(11) Cohesive Failure Rate (11-1) With Acrylics and Glass

On each of adherends (PMMA and glass) having a width of 25 mm, the composition was applied in a thickness of 0.1 mm over a width of 25 mm and a length of at least 10 mm. Reinforced glass plates with a thickness of 2 mm and a width of 25 mm were placed on the composition in such a manner that the reinforced glass plate sat on a 10 mm long portion of the composition. Thereafter, the composition was cured by the application of UV ray energy at a dose of 3000 mJ/cm$^2$, thereby preparing samples.

Immediately after the preparation of samples, and after 1 day and 3 days after the preparation of samples, the samples were subjected to a shear adhesion test in which the adherend and the glass plate were separated by the pulling at a cross head speed of 10 mm/min with use of an autograph manufactured by Shimadzu Corporation.

The area S mm$^2$ of the fractured portion of the composition on the adherend was measured, and the cohesive failure rate (%) was calculated from:

$$(100 \times S)/(10 \times 25).$$

(11-2) With Polarizing Plates

Polarizing plate films were provided which included liquid crystal polarizing films having a width of 25 mm (product name: SEG1425DU manufactured by Nitto Denko Corporation), anti-glare treated films (product name: AG150 manufactured by Nitto Denko Corporation), and anti-reflection treated films (product name: ARS Type manufactured by Nitto Denko Corporation). To each of the polarizing films, the composition was applied in a thickness of 0.1 mm over a width of 25 mm and a length of at least 60 mm. Reinforced glass plates with a thickness of 2 mm and a width of 25 mm were placed on the composition in such a manner that the reinforced glass plate sat on a 10 mm long portion of the composition. Thereafter, the composition was cured by the application of UV ray energy at a dose of 3000 mJ/cm$^2$, thereby preparing samples. Immediately after the preparation of samples, and after 2 hours after the preparation of samples, the samples were subjected to a bond peel test in which the adherend, namely, the polarizing film was peeled at 180° from the glass plate by the pulling at a cross head speed of 10 mm/min with use of an autograph manufactured by Shimadzu Corporation.

The area S mm$^2$ of the fractured portion of the composition on the adherend was measured, and the cohesive failure rate (%) was calculated from:

$$(100 \times S)/(10 \times 25).$$

(11-3) With Aluminum and Stainless Steel

On each of adherends (aluminum and stainless steel (SUS304)) having a width of 25 mm, the composition was applied in a thickness of 0.1 mm over a width of 25 mm and a length of at least 10 mm. Reinforced glass plates with a thickness of 2 mm and a width of 25 mm were placed on the composition in such a manner that the reinforced glass plate sat on a 10 mm long portion of the composition. Thereafter, the composition was cured by the application of UV ray energy at a dose of 3000 mJ/cm$^2$ through the glass, thereby preparing samples.

Immediately after the preparation of samples, and after 1 day and 3 days after the preparation of samples, the samples were subjected to a shear adhesion test in which the adherend and the glass plate were separated by the pulling at a cross head speed of 10 mm/min with use of an autograph manufactured by Shimadzu Corporation.

The area S mm$^2$ of the fractured portion of the composition on the adherend was measured, and the cohesive failure rate (%) relative to the coating area was calculated from:

$$(100 \times S)/(10 \times 25)$$

(12) Discoloration at High Temperatures

A cured product was stored at a temperature of 85° C. and a humidity of 85% for 500 hours. Thereafter, the cured product was brought back to a temperature of 23° C. and a humidity of 50%, and discoloration was evaluated by measuring a yellow index, an indicator of the degree of discoloration, with a spectrophotometer (CM-3500d manufactured by Minolta Co., Ltd.).

(13) Joint Performance

On a slide glass (S1112) manufactured by Matsunami Glass Ind., Ltd., the composition (the dam material) was applied in the form of a 75 mm×25 mm frame with a thickness of 200 μm and a width of 0.3 mm, and was cured by the application of UV ray energy at a dose of 2000 mJ/cm$^2$. A filler material (a filler) was applied inside the frame, and another slide glass (S1112) manufactured by Matsunami Glass Ind., Ltd. was placed thereon. The filler was similarly cured by the application of UV ray energy at a dose of 3000 mJ/cm$^2$. The joint was visually observed to evaluate viewability.

◯: The joint was almost invisible with the naked eye.

◯-Δ: The joint was hardly visible with the naked eye.

Δ: The joint was visible with the naked eye.

Δ-x: The joint was easily visible with the naked eye.

x: The joint was very clear.

Here, the filler material was prepared as follows. The details of (a-1), (c-1), (c-2) and (d-1) will be described later.

8.5 Parts by weight of (a-1), 79.76 parts by weight of a vinyl-terminated polymethylphenylsiloxane (viscosity 3000 cP) which had dimethylvinylsiloxy-blocked terminals and contained 5 mol % of diphenylsiloxy units and the balance of dimethylsiloxy units, and 10 parts by weight of an MQ resin were mixed together homogeneously. Thereafter, 0.22 parts by weight of (c-1), 0.22 parts by weight of (c-2) and 1.3 parts by weight of (d-1) were added. The resultant mixture was mixed to uniformity to give a filler material. The viscosity of the material at 23° C. was 2750 cP (rotational speed 60 rpm).

The MQ resin had the following properties:

Average structural formula of MQ resin: $\{(CH_3)_3SiO_{1/2}\}\{SiO_2\}_{3.5}$

Weight average molecular weight: 26200

The weight average molecular weight is a value measured by gel permeation chromatography (GPC) using a polystyrene calibration curve.

(14) Temperature Cycle Adhesion Test

Onto the surface of a glass plate (1 mm thickness, 137 mm×102 mm), the composition (the dam material) was applied in the form of a 135 mm×100 mm frame with a thickness of 200 μm and a width of 0.3 mm with use of a double thread screwed plastic needle (manufactured by Musashi Engineering, Inc.: needle length: 12.7 mm, gauge: 23 G (inner diameter 0.33 mm, outer diameter 0.64 mm)). The filler material (the filler) was applied inside the frame with a dispenser (2300N series) manufactured by SAN-EI-TECH Ltd. A PMMA plate (1 mm thickness, 157 mm×110 mm) was placed thereon, and the materials were cured by the application of UV ray energy at a dose of 5000 mJ/cm². After being allowed to stand at 23° C. for 1 hour, the sample was heated to 85° C., allowed to stand at the temperature for 6 hours, and brought back to 23° C. This cycle was repeated three times (apparatus: Bench-Top Environmental Test Chamber SU-661 manufactured by ESPEC CORP.).

After the completion of each cycle, the conditions of the cured product, the PMMA and the glass returned to 23° C. were observed with an optical microscope (×10 magnification).

The temperature cycle adhesion was evaluated as "Crack" when the cured product, the PMMA and the glass were free from separation but the cured product had a crack.

The temperature cycle adhesion was evaluated as "Sep. (separation)" when any separation had occurred between the cured product and at least one of the PMMA and the glass.

The component (A) in Examples and Comparative Examples is the following.

(a-1) Mercaptopropyl group-containing polymethylsiloxane Average structural formula:

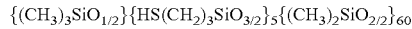

Viscosity: 330 cP

Transmittance through 10 mm thickness: 93.1%

Number of mercapto groups per unit weight: 0.97 mmol/g

The components (B1) in Examples and Comparative Examples are the following.

(b1-1) Vinyl-terminated polymethylphenylsiloxane

Vinyl-terminated polydimethyldiphenylsiloxane having dimethylvinylsiloxy-blocked terminals, and containing 5 mol % of diphenylsiloxy units and the balance of dimethylsiloxy units Average number of aliphatic unsaturated groups per molecule: 2

Average structural formula according to NMR measurement:

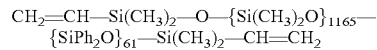

Viscosity: 98600 cP

Molecular weight: 98540

Synthesis of (b1-2)

Vinyl-terminated polydimethyldiphenylsiloxane having dimethylvinylsiloxy-blocked terminals, and containing 5 mol % of diphenylsiloxy units and the balance of dimethylsiloxy units Average number of aliphatic unsaturated groups per molecule: 2

Viscosity: 20020 cP

Average structural formula according to NMR measurement:

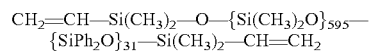

Molecular weight: 50130

The component (b1-2) was synthesized in the following manner.

A 3 L separable flask equipped with a cooling reflux tube and THREE-ONE MOTOR as a stirrer was loaded with 1800 g of 1,1,3,3,5,5,7,7-octamethylcyclotetrasiloxane, 260 g of 1,1,3,3,5,5,7,7-octaphenylcyclotetrasiloxane and 7.6 g of 1,1,3,3-tetramethyl-1,3-divinyldisiloxane. The mixture was dehydrated by being stirred and heated at 150 to 160° C. while blowing nitrogen gas at 0.5 Nm³/h for 3 hours. Subsequently, 0.1 g of potassium hydroxide was added, and the mixture was heated and stirred until the potassium hydroxide was dissolved uniformly in the flask and the viscosity was increased to 15000 cP to 18000 cP. Thereafter, the mixture was neutralized with 10 g of ethylene chlorohydrin at 100° C., filtered with use of CELITE SUPER FLOSS as a filtration aid, and subjected to a reduced pressure of 2 mmHg at 170 to 180° C. to remove low-boiling point components. As a result, 1832 g of a vinyl-terminated polymethylphenylsiloxane was obtained which had dimethylvinylsiloxy-blocked terminals and contained 5 mol % of diphenylsiloxy units and the balance of dimethylsiloxy units.

The component (B2) in Examples and Comparative Examples is the following.

(b2-1) $M_6D^vQ_8$ resin having an average structural formula:

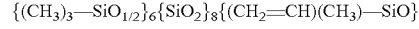

Weight average molecular weight: 22450

The weight average molecular weight is a value measured by gel permeation chromatography (GPC) using a polystyrene calibration curve.

The components (C) in Examples and Comparative Examples are the following.

(c-1) 2-hydroxy-2-methylpropiophenone (c-2) 2,2-dimethoxy-1,2-diphenylethan-1-one (c-3) 1-hydroxy-cyclohexyl-phenyl-ketone The component (D) in Examples and Comparative Examples is the following.

(d-1) 3-methacryloxypropyltrimethoxysilane

The components (E) in Examples and Comparative Examples are the following.

(e-1) fumed silica: BET specific surface area 200 m²/g (e-2) silazane (hexamethyldisilazane)-treated fumed silica: BET specific surface area 200 m²/g (e-3) fumed silica: BET specific surface area 350 m²/g (e-4) silazane (hexamethyldisilazane)-treated fumed silica: BET specific surface area 350 m²/g (e-5) octamethylcyclotetrasiloxane-treated fumed silica: BET specific surface area 200 m²/g The component (f-1) in Examples and Comparative Examples is the following.

(f-1) p-t-butylcatechol (polymerization inhibitor)

Example 1

A 5 L universal mixing stirrer (manufactured by Dalton Co., Ltd.) was loaded with 30 parts by weight (300 g) of the vinyl-terminated polymethylphenylsiloxane (b1-2) and 5 parts by weight (50 g) of the fumed silica. These were mixed with each other homogeneously at room temperature (22° C.) under low-speed lever rotation conditions for 30 minutes. To the homogeneous mixture, there were added 70 parts by weight (700 g) of the vinyl-terminated polymethylphenylsiloxane (b1-2) and 9.5 parts by weight (95 g) of the mercaptopropyl group-containing polymethylsiloxane (a-1). The mixture was mixed homogeneously. Further, the mixture was combined with a solution of 0.04 parts by weight (0.4 g) of p-t-butylcatechol (f-1), 0.3 parts by weight (3.0 g) of 2-hydroxy-2-methylpropiophenone (c-1) and 0.3 parts by weight (3.0 g) of 2,2-dimethoxy-1,2-diphenylethan-1-one (c-2), and further with 1.5 parts by weight (15 g) of 3-methacryloxypropyltrimethoxysilane (d-1). The resultant mixture was mixed homogeneously under reduced pressure while performing ice water cooling (8° C.) under low-speed lever rotation conditions for 30 minutes. Thereafter, unwanted substances such as foreign substances were removed through a clean 400-mesh wire cloth, thereby obtaining a composition.

In the same manner as in Example 1, compositions of Examples and Comparative Examples were prepared by following the formulations shown in Tables 1, 4 and 7, and properties were measured. The results are described in Tables 2, 3, 5, 6, 8 and 9.

In Examples 2 to 4 and 9 to 12, the component (b1-2) was added in two portions with a weight ratio of 30:70 similarly to Example 1.

In Examples 5 to 8, 13 to 15 and 19 to 25 and in Comparative Examples 1 and 2, the component (b1-2) was added in two portions with a weight ratio of 30:70 similarly to Example 1, and the component (b2-1) was added at the same time with the fumed silica.

In Comparative Example 3, the whole amounts of (b1-2), (b2-1) and (a-1) were mixed together, and thereafter the other components were added. r

TABLE 1

| | | | Ex. 1 | Ex. 2 | Ex. 3 | Ex. 4 |
|---|---|---|---|---|---|---|
| (a-1) | Mercaptopropyl group-containing polymethylsiloxane | (330 cP) | 9.5 | 9.5 | 9.5 | 9.5 |
| (b1-1) | Vinyl-terminated polymethylphenylsiloxane | (98600 cP) | | | | |
| (b1-2) | Vinyl-terminated polymethylphenylsiloxane | (20020 cP) | 100 | 100 | 100 | 100 |
| (b2-1) | $M_6 D^v Q_8$ resin | | | | | |
| (c-1) | 2-Hydroxy-2-methylpropiophenone | | 0.3 | 0.3 | 0.3 | 0.3 |
| (c-2) | 2,2-Dimethoxy-1,2-diphenylethan-1-one | | 0.3 | 0.3 | 0.3 | 0.3 |
| (c-3) | 1-Hydroxy-cyclohexyl-phenyl-ketone | | | | | |
| (d-1) | 3-Methacryloxypropyltrimethoxysilane | | 1.5 | 1.5 | 1.5 | 1.5 |
| (f-1) | P-t-butylcatechol | | 0.04 | 0.04 | 0.04 | 0.04 |
| (e-1) | Fumed silica (BET specific surface area 200 m²/g) | | | | | |
| (e-2) | Silazane-treated fumed silica (BET specific surface area 200 m²/g) | | | | | |
| (e-3) | Fumed silica (BET specific surface area 350 m²/g) | | 5 | 10 | 15 | 20 |
| (e-4) | Silazane-treated fumed silica (BET specific surface area 350 m²/g) | | | | | |
| (e-5) | Octamethylcyclotetrasiloxane-treated fumed silica (BET specific surface area 200 m²/g) | | | | | |
| HS: | Number of SH groups in (A), mmol | | 9.2 | 9.2 | 9.2 | 9.2 |
| ViB1: | Number of vinyl groups in (B1), mmol | | 4.0 | 4.0 | 4.0 | 4.0 |
| ViB2: | Number of vinyl groups in (B2), mmol | | 0.0 | 0.0 | 0.0 | 0.0 |
| ViB: | Number of vinyl groups in (B), mmol | | 4.0 | 4.0 | 4.0 | 4.0 |
| Proportion (%) of vinyl groups in (B2) to vinyl groups in (B) | | | 0.0 | 0.0 | 0.0 | 0.0 |
| ViD: | Number of vinyl groups in (D), mmol | | 6.0 | 6.0 | 6.0 | 6.0 |
| ViB + ViD: | Number of vinyl groups in (B) and (D), mmol | | 10.0 | 10.0 | 10.0 | 10.0 |
| HS/(ViB + ViD) | | | 0.92 | 0.92 | 0.92 | 0.92 |
| HS/ViD | | | 1.52 | 1.52 | 1.52 | 1.52 |
| HS/ViB | | | 2.31 | 2.31 | 2.31 | 2.31 |
| HS/ViB1 | | | 2.31 | 2.31 | 2.31 | 2.31 |

| | | | Ex. 5 | Ex. 6 | Ex. 7 | Ex. 8 |
|---|---|---|---|---|---|---|
| (a-1) | Mercaptopropyl group-containing polymethylsiloxane | (330 cP) | 9.5 | 9.5 | 9.5 | 9.5 |
| (b1-1) | Vinyl-terminated polymethylphenylsiloxane | (98600 cP) | | | | |
| (b1-2) | Vinyl-terminated polymethylphenylsiloxane | (20020 cP) | 90 | 90 | 90 | 90 |
| (b2-1) | $M_6 D^v Q_8$ resin | | 10 | 10 | 10 | 10 |
| (c-1) | 2-Hydroxy-2-methylpropiophenone | | 0.3 | 0.3 | 0.3 | 0.3 |
| (c-2) | 2,2-Dimethoxy-1,2-diphenylethan-1-one | | 0.3 | 0.3 | 0.3 | 0.3 |
| (c-3) | 1-Hydroxy-cyclohexyl-phenyl-ketone | | | | | |
| (d-1) | 3-Methacryloxypropyltrimethoxysilane | | 1.5 | 1.5 | 1.5 | 1.5 |
| (f-1) | P-t-butylcatechol | | 0.04 | 0.04 | 0.04 | 0.04 |
| (e-1) | Fumed silica (BET specific surface area 200 m²/g) | | | | | |
| (e-2) | Silazane-treated fumed silica (BET specific surface area 200 m²/g) | | | | | |
| (e-3) | Fumed silica (BET specific surface area 350 m²/g) | | 5 | 10 | 15 | 20 |
| (e-4) | Silazane-treated fumed silica (BET specific surface area 350 m²/g) | | | | | |
| (e-5) | Octamethylcyclotetrasiloxane-treated fumed silica (BET specific surface area 200 m²/g) | | | | | |
| HS: | Number of SH groups in (A), mmol | | 9.2 | 9.2 | 9.2 | 9.2 |
| ViB1: | Number of vinyl groups in (B1), mmol | | 3.6 | 3.6 | 3.6 | 3.6 |
| ViB2: | Number of vinyl groups in (B2), mmol | | 10.1 | 10.1 | 10.1 | 10.1 |

TABLE 1-continued

| | | | | | |
|---|---|---|---|---|---|
| ViB: | Number of vinyl groups in (B), mmol | 13.7 | 13.7 | 13.7 | 13.7 |
| Proportion (%) of vinyl groups in (B2) to vinyl groups in (B) | | 73.7 | 73.7 | 73.7 | 73.7 |
| ViD: | Number of vinyl groups in (D), mmol | 6.0 | 6.0 | 6.0 | 6.0 |
| ViB + ViD: | Number of vinyl groups in (B) and (D), mmol | 19.7 | 19.7 | 19.7 | 19.7 |
| HS/(ViB + ViD) | | 0.47 | 0.47 | 0.47 | 0.47 |
| HS/ViD | | 1.52 | 1.52 | 1.52 | 1.52 |
| HS/ViB | | 0.67 | 0.67 | 0.67 | 0.67 |
| HS/ViB1 | | 2.57 | 2.57 | 2.57 | 2.57 |

TABLE 2

| | | Ex. 1 | Ex. 2 | Ex. 3 | Ex. 4 |
|---|---|---|---|---|---|
| Viscosity of composition cP/23° C. | 12 rpm | 16900 | 24500 | 36700 | 83200 |
| | 6 rpm | 20700 | 30200 | 45900 | 104700 |
| Thixotropic ratio | | 1.225 | 1.233 | 1.251 | 1.258 |
| Visible light transmittance after curing, % | | 96.7 | 96.1 | 95.8 | 95 |
| Cure shrinkage % | | 0.13 | 0.13 | 0.12 | 0.12 |
| E hardness after curing | | 12 | 14 | 20 | 24 |
| Elongation after curing | | 230 | 240 | 250 | 240 |
| Specific gravity | | 1.02 | 1.04 | 1.06 | 1.09 |
| Crack resistance and discoloration | Heat shock | OK | OK | OK | OK |
| | Hot and humid conditions | OK | OK | OK | OK |
| Cohesive failure rate % | Immediately after UV exposure | 100 | 100 | 100 | 100 |
| Adherend: acrylic | After 1 day | 100 | 100 | 100 | 100 |
| | After 3 days | 100 | 100 | 100 | 100 |
| Cohesive failure rate % | Immediately after UV exposure | 100 | 100 | 100 | 100 |
| Adherend: glass | After 1 day | 100 | 100 | 100 | 100 |
| | After 3 days | 100 | 100 | 100 | 100 |
| Cohesive failure rate % | Untreated | 100 | 100 | 100 | 100 |
| With polarizing plates | Antireflection coated | 100 | 100 | 100 | 100 |
| | Hard coated | 100 | 100 | 100 | 100 |
| Cohesive failure rate % | With aluminum | 100 | 100 | 100 | 100 |
| | With stainless steel | 100 | 100 | 100 | 100 |
| Discoloration at high temperatures, Yellow Index | | 0.38 | 0.4 | 0.41 | 0.42 |
| Joint performance (Boundary appearance) | | ○-Δ | ○-Δ | Δ | Δ |
| Dischargeability, g | 20 G needle; 10 sec | 0.92 | 0.88 | 0.82 | 0.67 |

| | | Ex. 5 | Ex. 6 | Ex. 7 | Ex. 8 |
|---|---|---|---|---|---|
| Viscosity of composition cP/23° C. | 12 rpm | 18900 | 26700 | 39800 | 88900 |
| | 6 rpm | 23700 | 34000 | 51000 | 116000 |
| Thixotropic ratio | | 1.254 | 1.273 | 1.281 | 1.305 |
| Visible light transmittance after curing, % | | 96.6 | 96.0 | 95.6 | 95 |
| Cure shrinkage % | | 0.14 | 0.14 | 0.13 | 0.13 |
| E hardness after curing | | 16 | 14 | 16 | 21 |
| Elongation after curing | | 220 | 230 | 250 | 250 |
| Specific gravity | | 1.03 | 1.05 | 1.06 | 1.09 |
| Crack resistance and discoloration | Heat shock | OK | OK | OK | OK |
| | Hot and humid conditions | OK | OK | OK | OK |
| Cohesive failure rate % | Immediately after UV exposure | 100 | 100 | 100 | 100 |
| Adherend: acrylic | After 1 day | 100 | 100 | 100 | 100 |
| | After 3 days | 100 | 100 | 100 | 100 |
| Cohesive failure rate % | Immediately after UV exposure | 100 | 100 | 100 | 100 |
| Adherend: glass | After 1 day | 100 | 100 | 100 | 100 |
| | After 3 days | 100 | 100 | 100 | 100 |
| Cohesive failure rate % | Untreated | 100 | 100 | 100 | 100 |
| With polarizing plates | Antireflection coated | 100 | 100 | 100 | 100 |
| | Hard coated | 100 | 100 | 100 | 100 |
| Cohesive failure rate % | With aluminum | 100 | 100 | 100 | 100 |
| | With stainless steel | 100 | 100 | 100 | 100 |
| Discoloration at high temperatures, Yellow Index | | 0.39 | 0.41 | 0.41 | 0.43 |
| Joint performance (Boundary appearance) | | ○-Δ | ○-Δ | Δ | Δ |
| Dischargeability, g | 20 G needle; 10 sec | 0.89 | 0.87 | 0.77 | 0.64 |

TABLE 3

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Curability (E hardness) | 1000 mJ/cm$^2$ | — | — | — | — | 3 | 4 | 5 | 7 |
| | 2000 mJ/cm$^2$ | — | — | 2 | 2 | 11 | 10 | 13 | 17 |
| | 3000 mJ/cm$^2$ | 1 | 2 | 4 | 5 | 14 | 14 | 16 | 20 |
| | 4000 mJ/cm$^2$ | 4 | 7 | 7 | 8 | 16 | 14 | 16 | 21 |
| | 5000 mJ/cm$^2$ | 7 | 10 | 13 | 13 | 16 | 14 | | |
| | 6000 mJ/cm$^2$ | 10 | 13 | 18 | 19 | | | | |

TABLE 3-continued

| | Ex. 1 | Ex. 2 | Ex. 3 | Ex. 4 | Ex. 5 | Ex. 6 | Ex. 7 | Ex. 8 |
|---|---|---|---|---|---|---|---|---|
| 7000 mJ/cm$^2$ | 12 | 14 | 20 | 24 | | | | |
| 8000 mJ/cm$^2$ | 12 | | 20 | 24 | | | | |

TABLE 4

| | | | Ex. 9 | Ex. 10 | Ex. 11 | Ex. 12 | Ex. 13 | Ex. 14 |
|---|---|---|---|---|---|---|---|---|
| (a-1) | Mercaptopropyl group-containing polymethylsiloxane | (330 cP) | 13.4 | 13.4 | 13.4 | 13.4 | 13.4 | 13.4 |
| (b1-1) | Vinyl-terminated polymethylphenylsiloxane | (98600 cP) | | | | | | |
| (b1-2) | Vinyl-terminated polymethylphenylsiloxane | (20020 cP) | 100 | 100 | 100 | 100 | 90 | 90 |
| (b2-1) | M$_6$D$^v$Q$_8$ resin | | | | | | 10 | 10 |
| (c-1) | 2-Hydroxy-2-methylpropiophenone | | 0.2 | 0.2 | 0.2 | 0.2 | 0.2 | 0.2 |
| (c-2) | 2,2-Dimethoxy-1,2-diphenylethan-1-one | | 0.2 | 0.2 | 0.2 | 0.2 | 0.2 | 0.2 |
| (c-3) | 1-Hydroxy-cyclohexyl-phenyl-ketone | | | | | | | |
| (d-1) | 3-Methacryloxypropyltrimethoxysilane | | 1.5 | 1.5 | 1.5 | 1.5 | 1.5 | 1.5 |
| (f-1) | P-t-butylcatechol | | 0.04 | 0.04 | 0.04 | 0.04 | 0.04 | 0.04 |
| (e-1) | Fumed silica (BET specific surface area 200 m$^2$/g) | | | | | | | |
| (e-2) | Silazane-treated fumed silica (BET specific surface area 200 m$^2$/g) | | | | | | | |
| (e-3) | Fumed silica (BET specific surface area 350 m$^2$/g) | | 5 | 10 | 15 | 20 | | |
| (e-4) | Silazane-treated fumed silica (BET specific surface area 350 m$^2$/g) | | | | | | 5 | 10 |
| (e-5) | Octamethylcyclotetrasiloxane-treated fumed silica (BET specific surface area 200 m$^2$/g) | | | | | | | |
| HS: | Number of SH groups in (A), mmol | | 13.0 | 13.0 | 13.0 | 13.0 | 13.0 | 13.0 |
| ViB1: | Number of vinyl groups in (B1), mmol | | 4.0 | 4.0 | 4.0 | 4.0 | 3.6 | 3.6 |
| ViB2: | Number of vinyl groups in (B2), mmol | | 0.0 | 0.0 | 0.0 | 0.0 | 10.1 | 10.1 |
| ViB: | Number of vinyl groups in (B), mmol | | 4.0 | 4.0 | 4.0 | 4.0 | 13.7 | 13.7 |
| Proportion (%) of vinyl groups in (B2) to vinyl groups in (B) | | | 0.0 | 0.0 | 0.0 | 0.0 | 73.7 | 73.7 |
| ViD: | Number of vinyl groups in (D), mmol | | 6.0 | 6.0 | 6.0 | 6.0 | 6.0 | 6.0 |
| ViB + ViD: | Number of vinyl groups in (B) and (D), mmol | | 10.0 | 10.0 | 10.0 | 10.0 | 19.7 | 19.7 |
| HS/(ViB + ViD) | | | 1.30 | 1.30 | 1.30 | 1.30 | 0.66 | 0.66 |
| HS/ViD | | | 2.15 | 2.15 | 2.15 | 2.15 | 2.15 | 2.15 |
| HSA/ViB | | | 3.26 | 3.26 | 3.26 | 3.26 | 0.95 | 0.95 |
| HS/ViB1 | | | 3.26 | 3.26 | 3.26 | 3.26 | 3.62 | 3.62 |

| | | | Ex. 15 | Ex. 16 | Comp. Ex. 1 | Comp. Ex. 2 | Comp. Ex. 3 |
|---|---|---|---|---|---|---|---|
| (a-1) | Mercaptopropyl group-containing polymethylsiloxane | (330 cP) | 13.4 | 13.4 | 13.4 | 13.4 | 13.4 |
| (b1-1) | Vinyl-terminated polymethylphenylsiloxane | (98600 cP) | | | | | |
| (b1-2) | Vinyl-terminated polymethylphenylsiloxane | (20020 cP) | 90 | 90 | 90 | 90 | 100 |
| (b2-1) | M$_6$D$^v$Q$_8$ resin | | 10 | 10 | 10 | 10 | 10 |
| (c-1) | 2-Hydroxy-2-methylpropiophenone | | 0.2 | 0.2 | 0.2 | 0.2 | 0.3 |
| (c-2) | 2,2-Dimethoxy-1,2-diphenylethan-1-one | | 0.2 | 0.2 | 0.2 | 0.2 | 0.3 |
| (c-3) | 1-Hydroxy-cyclohexyl-phenyl-ketone | | | | | | |
| (d-1) | 3-Methacryloxypropyltrimethoxysilane | | 1.5 | 1.5 | 1.5 | 1.5 | 1.5 |
| (f-1) | P-t-butylcatechol | | 0.04 | 0.04 | 0.04 | 0.04 | 0.04 |
| (e-1) | Fumed silica (BET specific surface area 200 m$^2$/g) | | | | | | |
| (e-2) | Silazane-treated fumed silica (BET specific surface area 200 m$^2$/g) | | | | | | |
| (e-3) | Fumed silica (BET specific surface area 350 m$^2$/g) | | | | | | |
| (e-4) | Silazane-treated fumed silica (BET specific surface area 350 m$^2$/g) | | 15 | 20 | 25 | 30 | |
| (e-5) | Octamethylcyclotetrasiloxane-treated fumed silica (BET specific surface area 200 m$^2$/g) | | | | | | |
| HS: | Number of SH groups in (A), mmol | | 13.0 | 13.0 | 13.0 | 13.0 | 13.0 |
| ViB1: | Number of vinyl groups in (B1), mmol | | 3.6 | 3.6 | 3.6 | 3.6 | 4.0 |
| ViB2: | Number of vinyl groups in (B2), mmol | | 10.1 | 10.1 | 10.1 | 10.1 | 10.1 |
| ViB: | Number of vinyl groups in (B), mmol | | 13.7 | 13.7 | 13.7 | 13.7 | 14.1 |
| Proportion (%) of vinyl groups in (B2) to vinyl groups in (B) | | | 73.7 | 73.7 | 73.7 | 73.7 | 71.6 |
| ViD: | Number of vinyl groups in (D), mmol | | 6.0 | 6.0 | 6.0 | 6.0 | 6.0 |
| ViB + ViD: | Number of vinyl groups in (B) and (D), mmol | | 19.7 | 19.7 | 19.7 | 19.7 | 20.1 |
| HS/(ViB + ViD) | | | 0.66 | 0.66 | 0.66 | 0.66 | 0.65 |
| HS/ViD | | | 2.15 | 2.15 | 2.15 | 2.15 | 2.15 |
| HSA/ViB | | | 0.95 | 0.95 | 0.95 | 0.95 | 0.92 |
| HS/ViB1 | | | 3.62 | 3.62 | 3.62 | 3.62 | 3.26 |

TABLE 5

|  |  | Ex. 9 | Ex. 10 | Ex. 11 | Ex. 12 | Ex. 13 | Ex. 14 |
| --- | --- | --- | --- | --- | --- | --- | --- |
| Viscosity of composition | 12 rpm | 23400 | 30900 | 43200 | 100300 | 24500 | 32400 |
| cP/23° C. | 6 rpm | 29100 | 38700 | 54600 | 129000 | 30800 | 41100 |
| Thixotropic ratio |  | 1.244 | 1.252 | 1.264 | 1.286 | 1.257 | 1.269 |
| Visible light transmittance after curing, % |  | 96.9 | 96.4 | 96.2 | 95.4 | 97.1 | 96.9 |
| Cure shrinkage % |  | 0.13 | 0.13 | 0.13 | 0.12 | 0.13 | 0.13 |
| E hardness after curing |  | 13 | 15 | 21 | 25 | 19 | 21 |
| Elongation after curing, % |  | 240 | 270 | 280 | 280 | 240 | 260 |
| Specific gravity |  | 1.03 | 1.05 | 1.07 | 1.10 | 1.03 | 1.05 |
| Crack resistance and | Heat shock | OK | OK | OK | OK | OK | OK |
| discoloration | Hot and humid conditions | OK | OK | OK | OK | OK | OK |
| Cohesive failure rate % | Immediately after UV exposure | 100 | 100 | 100 | 100 | 100 | 100 |
| Adherend: acrylic | After 1 day | 100 | 100 | 100 | 100 | 100 | 100 |
|  | After 3 days | 100 | 100 | 100 | 100 | 100 | 100 |
| Cohesive failure rate % | Immediately after UV exposure | 100 | 100 | 100 | 100 | 100 | 100 |
| Adherend: glass | After 1 day | 100 | 100 | 100 | 100 | 100 | 100 |
|  | After 3 days | 100 | 100 | 100 | 100 | 100 | 100 |
| Cohesive failure rate % | Untreated | 100 | 100 | 100 | 100 | 100 | 100 |
| With polarizing plates | Antireflection coated | 100 | 100 | 100 | 100 | 100 | 100 |
|  | Hard coated | 100 | 100 | 100 | 100 | 100 | 100 |
| Cohesive failure rate % | With aluminum | 100 | 100 | 100 | 100 | 100 | 100 |
|  | With stainless steel | 100 | 100 | 100 | 100 | 100 | 100 |
| Discoloration at high temperatures Yellow Index |  | 0.39 | 0.41 | 0.42 | 0.43 | 0.4 | 0.42 |
| Joint performance (Boundary appearance) |  | ◯-Δ | ◯-Δ | ◯-Δ | Δ | ◯-Δ | ◯-Δ |
| Dischargeability, g | 20 G needle; 10 sec | 0.88 | 0.84 | 0.79 | 0.61 | 0.87 | 0.83 |

|  |  | Ex. 15 | Ex. 16 | Comp. Ex. 1 | Comp. Ex. 2 | Comp. Ex. 3 |
| --- | --- | --- | --- | --- | --- | --- |
| Viscosity of composition | 12 rpm | 46500 | 112000 | 145000 | 216000 | 20010 |
| cP/23° C. | 6 rpm | 60100 | 147000 | 198000 | 310200 | 20120 |
| Thixotropic ratio |  | 1.292 | 1.313 | 1.366 | 1.436 | 1.005 |
| Visible light transmittance after curing, % |  | 96.4 | 95.3 | 93.8 | 91.3 | 98.9 |
| Cure shrinkage % |  | 0.13 | 0.12 | 0.13 | 0.13 | 0.19 |
| E hardness after curing |  | 24 | 30 | 34 | 37 | 9 |
| Elongation after curing, % |  | 260 | 250 | 210 | 190 | 120 |
| Specific gravity |  | 1.07 | 1.10 | 1.13 | 1.17 | 1.01 |
| Crack resistance and | Heat shock | OK | OK | OK | OK | OK |
| discoloration | Hot and humid conditions | OK | OK | OK | OK | OK |
| Cohesive failure rate % | Immediately after UV exposure | 100 | 100 | 100 | 100 | 35 |
| Adherend: acrylic | After 1 day | 100 | 100 | 100 | 100 | 60 |
|  | After 3 days | 100 | 100 | 100 | 100 | 60 |
| Cohesive failure rate % | Immediately after UV exposure | 100 | 100 | 100 | 100 | 70 |
| Adherend: glass | After 1 day | 100 | 100 | 100 | 100 | 95 |
|  | After 3 days | 100 | 100 | 100 | 100 | 100 |
| Cohesive failure rate % | Untreated | 100 | 100 | 100 | 100 | 0 |
| With polarizing plates | Antireflection coated | 100 | 100 | 100 | 100 | 60 |
|  | Hard coated | 100 | 100 | 100 | 100 | 70 |
| Cohesive failure rate % | With aluminum | 100 | 100 | 25 | 10 | 80 |
|  | With stainless steel | 100 | 100 | 5 | 0 | 20 |
| Discoloration at high temperatures Yellow Index |  | 0.43 | 0.44 | 0.46 | 0.48 | 0.31 |
| Joint performance (Boundary appearance) |  | ◯-Δ | Δ | Δ-X | X | ◯ |
| Dischargeability, g | 20 G needle; 10 sec | 0.73 | 0.54 | 0.5 | 0.33 | 0.95 |

TABLE 6

|  |  | Ex. 9 | Ex. 10 | Ex. 11 | Ex. 12 | Ex. 13 | Ex. 14 | Ex. 15 | Ex. 16 | Comp. Ex. 1 | Comp. Ex. 2 | Comp. Ex. 3 |
| --- | --- | --- | --- | --- | --- | --- | --- | --- | --- | --- | --- | --- |
| Curability (E hardness) | 1000 mJ/cm² | — | — | — | — | 2 | 4 | 1 | 3 | 3 | 5 | — |
|  | 2000 mJ/cm² | — | — | — | — | 10 | 11 | 12 | 18 | 19 | 22 | — |
|  | 3000 mJ/cm² | — | — | — | — | 17 | 19 | 20 | 24 | 26 | 29 | — |
|  | 4000 mJ/cm² | — | — | 2 | 2 | 19 | 21 | 24 | 30 | 30 | 35 | 1 |
|  | 5000 mJ/cm² | — | 3 | 5 | 6 | 19 | 21 | 24 | 30 | 34 | 37 | 3 |
|  | 6000 mJ/cm² | 1 | 8 | 12 | 13 |  |  |  |  | 34 | 37 | 5 |
|  | 7000 mJ/cm² | 5 | 10 | 18 | 18 |  |  |  |  |  |  | 7 |
|  | 8000 mJ/cm² | 10 | 14 | 21 | 25 |  |  |  |  |  |  | 9 |
|  | 9000 mJ/cm² | 13 | 15 | 21 | 25 |  |  |  |  |  |  | 9 |
|  | 10000 mJ/cm² | 13 |  |  |  |  |  |  |  |  |  |  |
| Temperature cycle adhesion test | After 1 cycle | OK | OK | OK | OK | OK | OK | OK | OK | Crack | Crack | Crack |
|  | After 2 cycles | OK | OK | OK | OK | OK | OK | OK | OK | Crack | Crack | Sep. |
|  | After 3 cycles | Slightly separated edge | Slightly separated edge | Sep. | Sep. | OK | OK | OK | OK | Sep. | Sep. | Sep. |

TABLE 7

|  |  |  | Ex. 19 | Ex. 20 | Ex. 21 | Ex. 22 | Ex. 23 | Ex. 24 | Ex. 25 |
|---|---|---|---|---|---|---|---|---|---|
| (a-1) | Mercaptopropyl group-containing polymethylsiloxane (330 cP) | (330 cP) | 13.4 | 13.4 | 13.4 | 13.4 | 13.4 | 13.4 | 13.4 |
| (b1-1) | Vinyl-terminated polymethylphenylsiloxane (98600 cP) | (98600 cP) |  |  |  |  |  |  |  |
| (b1-2) | Vinyl-terminated polymethylphenylsiloxane (20020 cP) | (20020 cP) | 90 | 90 | 90 | 90 | 90 | 90 | 90 |
| (b2-1) | $M_6D^v Q_8$ resin |  | 10 | 10 | 10 | 10 | 10 | 10 | 10 |
| (c-1) | 2-Hydroxy-2-methylpropiophenone |  | 0.2 | 0.2 | 0.2 | 0.2 | 0.2 | 0.2 | 0.2 |
| (c-2) | 2,2-Dimethoxy-1,2-diphenylethan-1-one |  | 0.2 | 0.2 | 0.2 | 0.2 | 0.2 | 0.2 | 0.2 |
| (c-3) | 1-Hydroxy-cyclohexyl-phenyl-ketone |  |  |  |  |  |  |  |  |
| (d-1) | 3-Methacryloxypropyltrimethoxysilane |  | 1.5 | 1.5 | 1.5 | 1.5 | 1.5 | 1.5 | 1.5 |
| (f-1) | P-t-butylcatechol |  | 0.04 | 0.04 | 0.04 | 0.04 | 0.04 | 0.04 | 0.04 |
| (e-1) | Fumed silica (BET specific surface area 200 $m^2/g$) |  |  |  |  |  |  |  |  |
| (e-2) | Silazane-treated fumed silica (BET specific surface area 200 $m^2/g$) |  | 7.5 | 10 | 7.5 | 10 |  |  |  |
| (e-3) | Fumed silica (BET specific surface area 350 $m^2/g$) |  |  |  |  |  |  |  |  |
| (e-4) | Silazane-treated fumed silica (BET specific surface area 350 $m^2/g$) |  |  |  |  |  |  |  |  |
| (e-5) | Octamethylcyclotetrasiloxane-treated fumed silica (BET specific surface area 200 $m^2/g$) |  |  |  |  |  | 7.5 | 10 | 15 |
| HS: | Number of SH groups in (A), mmol |  | 13.0 | 13.0 | 13.0 | 13.0 | 13.0 | 13.0 | 13.0 |
| ViB1: | Number of vinyl groups in (B1), mmol |  | 3.6 | 3.6 | 3.6 | 3.6 | 3.6 | 3.6 | 3.6 |
| ViB2: | Number of vinyl groups in (B2), mmol |  | 10.1 | 10.1 | 10.1 | 10.1 | 10.1 | 10.1 | 10.1 |
| ViB: | Number of vinyl groups in (B), mmol |  | 13.7 | 13.7 | 13.7 | 13.7 | 13.7 | 13.7 | 13.7 |
| Proportion (%) of vinyl groups in (B2) to vinyl groups in (B) |  |  | 73.7 | 73.7 | 73.7 | 73.7 | 73.7 | 73.7 | 73.7 |
| ViD: | Number of vinyl groups in (D), mmol |  | 6.0 | 6.0 | 6.0 | 6.0 | 6.0 | 6.0 | 6.0 |
| ViB + ViD; | Number of vinyl groups in (B) and (D), mmol |  | 19.7 | 19.7 | 19.7 | 19.7 | 19.7 | 19.7 | 19.7 |
| HS/(ViB + ViD) |  |  | 0.66 | 0.66 | 0.66 | 0.66 | 0.66 | 0.66 | 0.66 |
| HS/ViD |  |  | 2.15 | 2.15 | 2.15 | 2.15 | 2.15 | 2.15 | 2.15 |
| HS/ViB |  |  | 0.95 | 0.95 | 0.95 | 0.95 | 0.95 | 0.95 | 0.95 |
| HS/ViB1 |  |  | 3.62 | 3.62 | 3.62 | 3.62 | 3.62 | 3.62 | 3.62 |

TABLE 8

|  |  | Ex. 19 | Ex. 20 | Ex. 21 | Ex. 22 | Ex. 23 | Ex. 24 | Ex. 25 |
|---|---|---|---|---|---|---|---|---|
| Viscosity of composition cP/23° C. | 12 rpm | 19800 | 23800 | 22000 | 25000 | 21200 | 27800 | 32300 |
|  | 6 rpm | 23400 | 28700 | 26700 | 30550 | 30670 | 42040 | 49800 |
| Thixotropic ratio |  | 1.182 | 1.206 | 1.214 | 1.222 | 1.447 | 1.512 | 1.542 |
| Visible light transmittance after curing, % |  | 95.2 | 94.3 | 95.3 | 94.4 | 96.5 | 95.7 | 94.6 |
| Cure shrinkage % |  | 0.14 | 0.14 | 0.14 | 0.14 | 0.13 | 0.13 | 0.14 |
| E hardness after curing |  | 14 | 18 | 15 | 16 | 20 | 15 | 18 |
| Elongation after curing, % |  | 180 | 220 | 200 | 240 | 220 | 250 | 280 |
| Specific gravity |  | 1.04 | 1.05 | 1.04 | 1.05 | 1.05 | 1.06 | 1.08 |
| Crack resistance and discoloration | Heat shock | OK | OK | OK | OK | OK | OK | OK |
|  | Hot and humid conditions | OK | OK | OK | OK | OK | OK | OK |
| Cohesive failure rate % Adherend: acrylic | Immediately after UV exposure | 100 | 100 | 100 | 100 | 100 | 100 | 100 |
|  | After 1 day | 100 | 100 | 100 | 100 | 100 | 100 | 100 |
|  | After 3 days | 100 | 100 | 100 | 100 | 100 | 100 | 100 |
| Cohesive failure rate % Adherend: glass | Immediately after UV exposure | 100 | 100 | 100 | 100 | 100 | 100 | 100 |
|  | After 1 day | 100 | 100 | 100 | 100 | 100 | 100 | 100 |
|  | After 3 days | 100 | 100 | 100 | 100 | 100 | 100 | 100 |
| Cohesive failure rate % With polarizing plates | Untreated | 100 | 100 | 100 | 100 | 100 | 100 | 100 |
|  | Antireflection coated | 100 | 100 | 100 | 100 | 100 | 100 | 100 |
|  | Hard coated | 100 | 100 | 100 | 100 | 100 | 100 | 100 |
| Cohesive failure rate % | With aluminum | 100 | 100 | 100 | 100 | 100 | 100 | 100 |
|  | With stainless steel | 100 | 100 | 100 | 100 | 100 | 100 | 100 |
| Discoloration at high temperatures Yellow Index |  | 0.38 | 0.39 | 0.4 | 0.41 | 0.39 | 0.39 | 0.39 |
| Joint performance (Boundary appearance) |  | ○-Δ | Δ | ○-Δ | Δ | ○-Δ | ○-Δ | Δ |
| Dischargeability, g | 20 G needle; 10 sec | 0.91 | 0.86 | 0.88 | 0.87 | 0.78 | 0.66 | 0.61 |

TABLE 9

|  |  | Ex. 19 | Ex. 20 | Ex. 21 | Ex. 22 | Ex. 23 | Ex. 24 | Ex. 25 |
|---|---|---|---|---|---|---|---|---|
| Curability (E hardness) | 1000 mJ/$cm^2$ | 2 | 2 | 2 | 3 | 1 | 2 | 3 |
|  | 2000 mJ/$cm^2$ | 9 | 10 | 11 | 12 | 8 | 7 | 10 |
|  | 3000 mJ/$cm^2$ | 12 | 16 | 14 | 18 | 12 | 13 | 18 |
|  | 4000 mJ/$cm^2$ | 14 | 18 | 16 | 20 | 14 | 16 | 21 |
|  | 5000 mJ/$cm^2$ | 14 | 18 | 16 | 20 | 15 | 18 | 23 |
|  | 6000 mJ/$cm^2$ |  |  |  |  | 15 | 18 | 23 |

TABLE 9-continued

|  |  | Ex. 19 | Ex. 20 | Ex. 21 | Ex. 22 | Ex. 23 | Ex. 24 | Ex. 25 |
|---|---|---|---|---|---|---|---|---|
| Temperature cycle adhesion test | After 1 cycle | OK | OK | OK | OK | OK | OK | OK |
|  | After 2 cycles | OK | OK | OK | OK | OK | OK | OK |
|  | After 3 cycles | OK | OK | OK | OK | OK | OK | OK |

The compositions according to the invention afford cured products which exhibit properties such as hardness and adhesion suited for use in image displays. The cured products form inconspicuous joints with sealants, and advantageous viewability may be achieved.

Comparative Example 3 illustrates that poor adhesion and curability are encountered in the absence of a fumed silica having a specific BET specific surface area. Further, as demonstrated in Comparative Examples 1 and 2, even the addition of a fumed silica having a specific BET specific surface area results in poor adhesion and poor viewability, namely, poor joint performance when the amount of the fumed silica added exceeds the inventive range.

INDUSTRIAL APPLICABILITY

The inventive dam compositions may form dam frames in image displays which exhibit appropriate hardness and adhesion with respect to adherends. According to a preferred embodiment, the dam frame further has an inconspicuous joint with a sealant applied inside the frame, and consequently image displays having good viewability may be obtained.

The invention claimed is:

1. An image display sealant dam composition that comprises:
   (A) a polyorganosiloxane having a mercaptoalkyl group bonded to a silicon atom, the polyorganosiloxane (A) having a viscosity at 23° C. of 20 to 25000 cP;
   (B) an aliphatic unsaturated group-containing polyorganosiloxane including an aliphatic unsaturated group-containing linear polyorganosiloxane (B1) represented by the following formula (I):

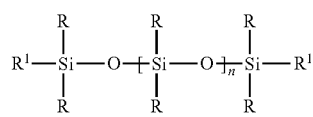

wherein in the formula (I):
each R1 group independently represents an aliphatic unsaturated group,
each R group independently represents a C1 to C6 alkyl group or a C6 to C12 aryl group, and 1 to 60 mol % of the total R groups are C6 to C12 aryl groups, and
the letter n is a value such that the viscosity at 23° C. is 100 to 1,000,000 cP, and
optionally further including a branched polyorganosiloxane (B2) having $SiO_{4/2}$ units, $R'_3SiO_{1/2}$ units and $R'_2SiO_{2/2}$ units, and optionally further having $R'SiO_{3/2}$ units in the formulae, each R' group is independently a C1 to C6 alkyl group or an aliphatic unsaturated group, wherein at least three R' groups per molecule of the branched polyorganosiloxane (B2) are aliphatic unsaturated groups;
   (C) a photoreaction initiator;
   (D) at least one aliphatic unsaturated group-containing silane compound; and
   (E) a hexamethyldisilazine-treated fumed silica having a BET specific surface area of 300 to 500 $m^2/g$;
wherein a ratio of the number of the mercaptoalkyl groups present in (A) to the total number of the aliphatic unsaturated groups in (B) and (D) is 0.45 to 1.50;
(E) is in an amount of 0.5 to 24 parts by weight per 100 parts by weight of (B); and
said dam composition has a viscosity at 23° C. of 20,000 to 2,000,000 cP.

2. The image display sealant dam composition according to claim 1, wherein a ratio of the number of the mercaptoalkyl groups in (A) to the number of the aliphatic unsaturated groups in (B) is 0.5 to 4.0.

3. The image display sealant dam composition according to claim 2, wherein a ratio of the number of the mercaptoalkyl groups in (A) to the number of the aliphatic unsaturated groups in (D) is 1.2 to 3.5.

4. The image display sealant dam composition according to claim 2, wherein a thixotropic ratio $V_{6rpm}/V_{12rpm}$ of said dam composition is 1.05 to 2.0, wherein $V_{6rpm}$ and $V_{12rpm}$ are values of the viscosity in cP of said dam composition measured with a B-type rotational viscometer at 23° C. and a rotational speed of 6 rpm, and at 23° C. and a rotational speed of 12 rpm, respectively.

5. The image display sealant dam composition according to claim 2, wherein (C) is in an amount of 0.05 to 50 parts by weight per 100 parts by weight of (B).

6. The image display sealant dam composition according to claim 2, wherein the aliphatic unsaturated group-containing silane compound (D) is at least one compound selected from the group consisting of 3-methacryloxypropyltriethoxysilane, 3-methacryloxypropyltrimethoxysilane, vinyltrimethoxysilane and vinyltriethoxysilane.

7. The image display sealant dam composition according to claim 1, wherein a ratio of the number of the mercaptoalkyl groups in (A) to the number of the aliphatic unsaturated groups in (D) is 1.2 to 3.5.

8. The image display sealant dam composition according to claim 7, wherein a thixotropic ratio $V_{6rpm}/V_{12rpm}$ is 1.05 to 2.0, wherein $V_{6rpm}$ and $V_{12rpm}$ are values of the viscosity in cP of said dam composition measured with a B-type rotational viscometer at 23° C. and a rotational speed of 6 rpm, and at 23° C. and a rotational speed of 12 rpm, respectively.

9. The image display sealant dam composition according to claim 7, wherein (C) is in an amount of 0.05 to 50 parts by weight per 100 parts by weight of (B).

10. The image display sealant dam composition according to claim 1, wherein a thixotropic ratio $V_{6rpm}/V_{12rpm}$ of said dam composition is 1.05 to 2.0, wherein $V_{6rpm}$ and $V_{12rpm}$ are values of the viscosity in cP of said dam composition measured with a B-type rotational viscometer at 23° C. and a rotational speed of 6 rpm, and at 23° C. and a rotational speed of 12 rpm, respectively.

11. The image display sealant dam composition according to claim 10, wherein (C) is in an amount of 0.05 to 50 parts by weight per 100 parts by weight of (B).

12. The image display sealant dam composition according to claim 1, wherein (C) is in an amount of 0.05 to 50 parts by weight per 100 parts by weight of (B).

13. The image display sealant dam composition according to claim 1, wherein the aliphatic unsaturated group-containing silane compound (D) is at least one compound selected from the group consisting of 3-methacryloxypropyltriethoxysilane, 3-methacryloxypropyltrimethoxysilane, vinyltrimethoxysilane and vinyltriethoxysilane.

14. An image display that comprises an image display component and a protective component sealed with the image display sealant dam composition according to claim 1.

* * * * *